(12) United States Patent
Yamasaki et al.

(10) Patent No.: US 8,659,193 B2
(45) Date of Patent: Feb. 25, 2014

(54) CONTROL DEVICE FOR ELECTRIC MOTOR

(75) Inventors: Masashi Yamasaki, Obu (JP); Hiroshi Imai, Toyohashi (JP); Katsuji Kawai, Kosai (JP)

(73) Assignee: Denso Corporation, Kariya (JP)

( * ) Notice: Subject to any disclaimer, the term of this patent is extended or adjusted under 35 U.S.C. 154(b) by 183 days.

(21) Appl. No.: 13/085,526

(22) Filed: Apr. 13, 2011

(65) Prior Publication Data

US 2011/0254393 A1 Oct. 20, 2011

(30) Foreign Application Priority Data

Apr. 16, 2010 (JP) .................. 2010-94787

(51) Int. Cl.
  *H02K 5/20* (2006.01)
  *H02K 11/00* (2006.01)
  *H02K 5/00* (2006.01)
(52) U.S. Cl.
  USPC ................ 310/64; 310/68 R; 310/71; 310/89
(58) Field of Classification Search
  USPC ...................... 310/64, 68 R, 71, 89; 174/521
  See application file for complete search history.

(56) References Cited

U.S. PATENT DOCUMENTS

| | | | |
|---|---|---|---|
| 7,042,122 B1 * | 5/2006 | Dufala et al. ............... | 310/68 R |
| 2003/0047304 A1 | 3/2003 | Kasuga | |
| 2003/0127921 A1 | 7/2003 | Akutsu et al. | |
| 2003/0200761 A1 * | 10/2003 | Funahashi et al. ........... | 62/228.4 |
| 2008/0174213 A1 * | 7/2008 | Peterson et al. ............ | 310/68 R |

FOREIGN PATENT DOCUMENTS

JP    2008185038 A  *  8/2008

OTHER PUBLICATIONS

Machine Translation JP2008185038 (2008).*
Office Action (7 pages) dated Feb. 8, 2013, issued in corresponding Chinese Application No. 201110096364.0 and English translation (10 pages).
Office Action (5 pages) dated Sep. 11, 2013, issued in corresponding Chinese Application No. 201110096364.0 and English translation (8 pages).

* cited by examiner

*Primary Examiner* — Tran Nguyen
*Assistant Examiner* — Jose Gonzalez Quinones
(74) *Attorney, Agent, or Firm* — Nixon & Vanderhye PC

(57) ABSTRACT

A power module for supplying driving current to coils wound on a stator of an electric motor and a heat sink for absorbing heat generated at the power module are provided at an axial outside of a motor casing. An intermediate member is provided between the motor casing and the heat sink. The intermediate member has a bottom plate portion fixed to an axial end plate of the motor casing and a cylindrical side wall axially extending from the bottom plate portion. An outer peripheral surface of the heat sink is in contact with an inner peripheral surface of the cylindrical side wall, so that the power module fixed to the heat sink is arranged in a space, which is within a range smaller than an outer diameter of the motor casing.

1 Claim, 31 Drawing Sheets

CONTROL DEVICE FOR ELECTRIC MOTOR

CROSS-REFERENCE TO RELATED APPLICATION

This application is based on Japanese Patent Application No. 2010-094787 filed on Apr. 16, 2010, the disclosure of which is incorporated herein by reference.

FIELD OF THE INVENTION

The present invention relates to an electric motor device, in which an electronic control unit is arranged at an axial end of a motor shaft.

BACKGROUND OF THE INVENTION

An electric power steering device is known in the art, according to which a steering operation of a vehicle driver is assisted by an electric motor. Miniaturization, weight saving and higher performance are required for the electric motor.

According to one of prior arts, for example, as disclosed in Japanese Patent Publication No. 2003-204654, more exactly as shown in FIGS. 14 and 15 thereof, an electronic control unit (also referred to as a controller) is attached to an electric motor in such a direction parallel to a rotating shaft of the electric motor, which is composed of a motor casing, a stator, a rotor, the rotating shaft and so on. The controller is composed of a heat sink, a metal board, a control board and so on. The electric motor and the controller are connected to each other in such a way that an opening portion formed in the electric motor and an opening portion formed in the controller are opposed to each other. Lead wires are arranged so as to pass through the respective opening portions of the electric motor and the controller, so that coils wound on the stator of the electric motor are electrically connected to wires formed on the metal board of the controller. In addition, other lead wires pass through the respective opening portions of the electric motor and the controller, so that a position sensor for detecting a rotational angle of the electric motor is electrically connected to wires formed on the control board of the controller.

According to another prior art, for example, as shown in FIGS. 32 and 33 attached to the present application, a controller 101 is attached to an axial end of an electric motor 100. The controller 101 is so designed that its outer diameter is equal to or smaller than that of a motor casing 102 of the electric motor 100. Multiple flanged portions 103 of the controller 101, which are outwardly extending in a radial direction, are opposed to corresponding projecting portions 104 of the motor casing 102, which are likewise outwardly extending in the radial direction, and the electric motor 100 and the controller 101 are fixed to each other by screws 105.

According to the electric motor of the above first-mentioned prior art (JP 2003-204654) a size in a radial direction becomes too large and it may be a problem that a larger mounting space is necessary when the electric motor is mounted in a vehicle.

According to the electric motor of the other prior art, as shown in FIGS. 32 and 33, when the flanged portions 103 as well as the projecting portions 104 are designed so that an outer diameter of the electric motor (including the flanged and projecting portions) is within a required range, then the outer diameter of the electric motor and the controller becomes too small and thereby a decrease of a motor output may be a problem.

In addition, according to the electric motor of the above prior art (JP 2003-204654), it may have a problem that extraneous material may come into the motor casing through the opening portion thereof and operation of the stator and/or rotor may be adversely affected.

SUMMARY OF THE INVENTION

The present invention is made in view of the above problems. It is an object of the present invention to provide an electric motor device, according to which motor output is increased without making larger a size of the electric motor device in a radial direction.

In addition, it is a further object of the present invention to provide the electric motor device, according to which it is possible to suppress such a situation that extraneous may come into a motor casing of the electric motor device through an opening portion thereof and thereby suppress unfavorable operation of a stator and a rotor of the electric motor device.

According to a feature of the present invention, for example, an electric motor device comprises; a motor casing having a cylindrical wall portion and an axial end plate extending from one axial end of the cylindrical wall portion in a radial and inward direction; a stator fixed to an inner peripheral surface of the motor casing; and a rotor rotatably supported in the motor casing so that the rotor is rotated in the stator. The electric motor device further comprises; a power module provided at an outside of the motor casing at one axial end of a rotating shaft of the rotor for supplying driving current to coils wound on the stator and/or the rotor; a heat sink provided at the outside of the motor casing, the power module being fixed to the heat sink so that heat generated at the power module is absorbed by the heat sink; and an intermediate member provided between the motor casing and the heat sink. In the electric motor device, the intermediate member has a bottom plate portion fixed to the axial end plate of the motor casing and a side wall axially extending from the bottom plate portion in a direction opposite to the motor casing, an upper end of the side wall is in contact with the heat sink, and the intermediate member is arranged in a space, which is not larger than a size of the motor casing in its radial direction.

According to the above feature, since the heat sink is connected to the motor casing via the intermediate member, it is possible to provide a controller (which is composed of the heat sink, the power module and so on) at the axial outside of the motor casing and to arrange the controller within the space, which is not larger than the size of the motor casing in its radial direction (that is, an outer diameter of the motor casing). Since it is possible to effectively use the space (smaller than the outer diameter of the motor casing), design flexibility of the power module is increased and output of the electric motor device can be enhanced.

Generally, the electric motor and the controller are separately manufactured and then assembled together. In a case that the heat sink is fixed to the motor casing (including therein the stator and rotor), for example, by a screw, extraneous material which may be produced in a screwing process may come into the motor casing. There may be, therefore, a danger that an operation of the stator and/or rotor is adversely affected by such extraneous material. According to the invention, however, it can be possible to fix the intermediate member to the motor casing before the stator and rotor are assembled to the motor casing. Any extraneous material is removed from the motor casing, and then the stator and the rotor can be assembled to the motor casing. Therefore, it can be possible to suppress come-in of the extraneous material into the motor casing and thereby unfavorable operation of the stator and/or rotor.

According to another feature of the present invention, for example, the rotating shaft is fixed to the rotor and rotatably supported at the axial end plate. The electric motor device further comprises; a permanent magnet attached to an axial end of the rotating shaft on a side to the heat sink; a control board fixed to the heat sink on a side to the permanent magnet; and a position sensor mounted on the control board and generating an output signal depending on a direction of magnetic field generated by the permanent magnet.

In the above electric motor device, the axial end plate of the motor casing has a first cylindrical portion extending in an axial direction of the rotor, the bottom plate portion of the intermediate member has a second cylindrical portion formed at a position corresponding to the first cylindrical portion and extending in the axial direction, and an outer peripheral surface of the heat sink is brought into contact with an inner peripheral surface of the side wall of the intermediate member, so that the position sensor is arranged at a predetermined location with respect to the permanent magnet.

Since the second cylindrical portion of the intermediate member is brought into contact with the first cylindrical portion of the motor casing, the intermediate member can be coaxially fixed to the motor casing. In addition, since the outer peripheral surface of the heat sink is brought into contact with the inner peripheral surface of the side wall of the intermediate member, the heat sink can be coaxially fixed to the intermediate member. As a result, a displacement in the circumferential direction between the position sensor, which is mounted on the control board fixed to the heat sink, and the permanent magnet, which is attached to the axial end of the rotating shaft rotatably supported by the motor casing, can be suppressed.

According to a further feature of the present invention, for example, the power module has a first connector, to which electric current is supplied from an outside power source, and the intermediate member has a first protection wall axially extending from the bottom plate portion for closing a space between the motor casing and the first connector.

According to a still further feature of the present invention, for example, the control board has a second connector, to which signals are supplied from outside of the electric motor device, and the intermediate member has a second protection wall axially extending from the bottom plate portion for closing a space between the motor casing and the second connector.

According to the above feature, it is possible to suppress incoming dust through a gap between the motor casing and the first and/or second connectors.

According to a still further feature of the present invention, for example, the intermediate member is made of material, which has coefficient of thermal expansion close to that of material for the motor casing.

When the stator is assembled to the motor casing after the intermediate member is fixed to the motor casing, the motor casing is heated together with the intermediate member to thermally expand so that the stator can be assembled to the motor casing, by so-called shrinkage fitting process. According to the above feature of the invention, it is possible to heat the motor casing as well as the intermediate member in the same condition for heating the motor casing alone. It is, therefore, possible to assemble the stator to the motor casing in a simple manner, without applying load at a fixing portion between the motor casing and the intermediate member.

According to a still further feature of the present invention, for example, the heat sink has multiple projections at the outer peripheral surface thereof, each of which is projected in a radial outward direction and brought into contact with an upper end of the side wall of the intermediate member. The intermediate member has multiple claw portion at such positions corresponding to the respective projections, each of which is axially extending from the upper end of the side wall of the intermediate member, and each of the claw portions is bent in a circumferential direction, so that the heat sink is firmly fixed to the intermediate member.

According to the above feature, it is possible to fix the heat sink to the intermediate member in a simple structure. In addition, since the projections are in contact with the upper end of the side wall of the intermediate member in the axial direction, a displacement in the axial direction between the position sensor and the permanent magnet can be suppressed.

According to a still further feature of the present invention, for example, the intermediate member has a screw hole extending in the axial direction at the bottom surface plate. The heat sink has a through-hole extending in the axial direction at such a position corresponding to the screw hole. A bolt is inserted through the through-hole and fixed to the screw hole, so that the heat sink is firmly fixed to the intermediate member.

Since the bolt is filled in the heat sink, the space of the heat sink utilized for the power module can be made larger, wherein the space is within a range of the outer diameter of the motor casing.

According to a still further feature of the present invention, for example, the heat sink has a leg portion, an axial forward end of which is in contact with the bottom plate portion so that an axial distance between the heat sink and the intermediate member is set at a predetermined value.

According to such a feature, it is possible to keep a distance between the position sensor and the permanent magnet at a predetermined value.

According to a still further feature of the present invention, for example, the heat sink has a recessed portion at an outer wall thereof, and the side wall of the intermediate member has a projected portion at a position corresponding to the recessed portion, so that a part of an inner surface of the side wall is projected into the recessed portion.

According to the above feature, it is possible to form the projected portion by pressing a corresponding portion of the outer surface of the side wall. It is, therefore, possible to fix the heat sink to the intermediate member in a simple manner.

According to a still further feature of the present invention, for example, the heat sink has flat surface portions at both sides thereof in the radial direction, and the side wall of the intermediate member has a pair of flat wall portions, so that each of the flat wall portions is in contact with the respective flat surface portions of the heat sink.

When the heat sink is fixed to the intermediate member by, for example, bolts, rivets, and so on, at the flat surface portions and the flat wall portions, heads of such bolts or rivets can be arranged in the space, which is within the range of the outer diameter of the motor casing.

According to a still further feature of the present invention, for example, a holder plate is provided in the motor casing between the axial end plate and the stator or the rotor, so that the holder plate prevents any extraneous material, which is produced when the intermediate member is connected to the motor casing, from coming into the inside of the stator or the rotor.

According to a still further feature of the present invention, for example, a holder plate is likewise provided in the motor casing between the axial end plate and the stator or the rotor, so that the holder plate prevents any extraneous material, which is produced when the heat sink is fixed to the motor casing by the fixing member, from coming into the inside of the stator or the rotor.

According to the above feature, it is possible to suppress unfavorable operation of the stator and/or rotor, which may be caused by the incoming extraneous material into a space between the stator and rotor.

According to a still further feature of the present invention, for example, the fixing means is composed of; a screwed portion formed in the axial end plate of the motor casing and extending from the axial end plate into the inside of the motor casing; and a bolt inserted through a through-hole formed in the heat sink and fixed to the screwed portion. In addition, the holder plate has a tray portion of a cylindrical shape having a bottom for covering an end of the screwed portion so as to receive and hold the extraneous material.

According to the above feature, a labyrinth structure is formed between an outer wall of the screwed portion and an inner wall of the tray portion. Therefore, it is possible to surely prevent the extraneous material, which may be produced when the heat sink is fixed to the motor housing, from coming into a space between the stator and the rotor.

According to a still further feature of the present invention, for example, a stickum is applied to the tray portion. Therefore, it is possible to surely trap the extraneous material, which may be produced when the heat sink is fixed to the motor housing.

According to a still further feature of the present invention, for example, the fixing means is composed of; a nut provided in the motor casing; and a bolt inserted through a through-hole formed in the heat sink and fixed to the nut, wherein the holder plate has a supporting portion for supporting the nut.

According to the above feature, it is not necessary to form a screwed portion in the motor casing. Therefore, the heat sink can be fixed to the motor casing with a reduced manufacturing cost.

According to a still further feature of the present invention, for example, the fixing means is composed of; a screwed hole formed in the heat sink on a side to the motor casing; and a bolt inserted from the inside of the motor casing and fixed to the screwed hole.

According to the above feature, it is not necessary to keep a space in the heat sink for a process of screwing the bolts or rivets. Therefore, it is possible to keep a larger space for the power module and the control board. As a result, the design flexibility for the power module and/or the control board can be increased and thereby the output of the electric motor can be enhanced.

According to a still further feature of the present invention, for example, the holder plate has a guide portion for guiding connecting lead wires, which connect the coils to the power module.

According to such a feature, the connecting wires can be positioned and thereby it becomes possible to easily connect the connecting wires to terminals of the power module.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
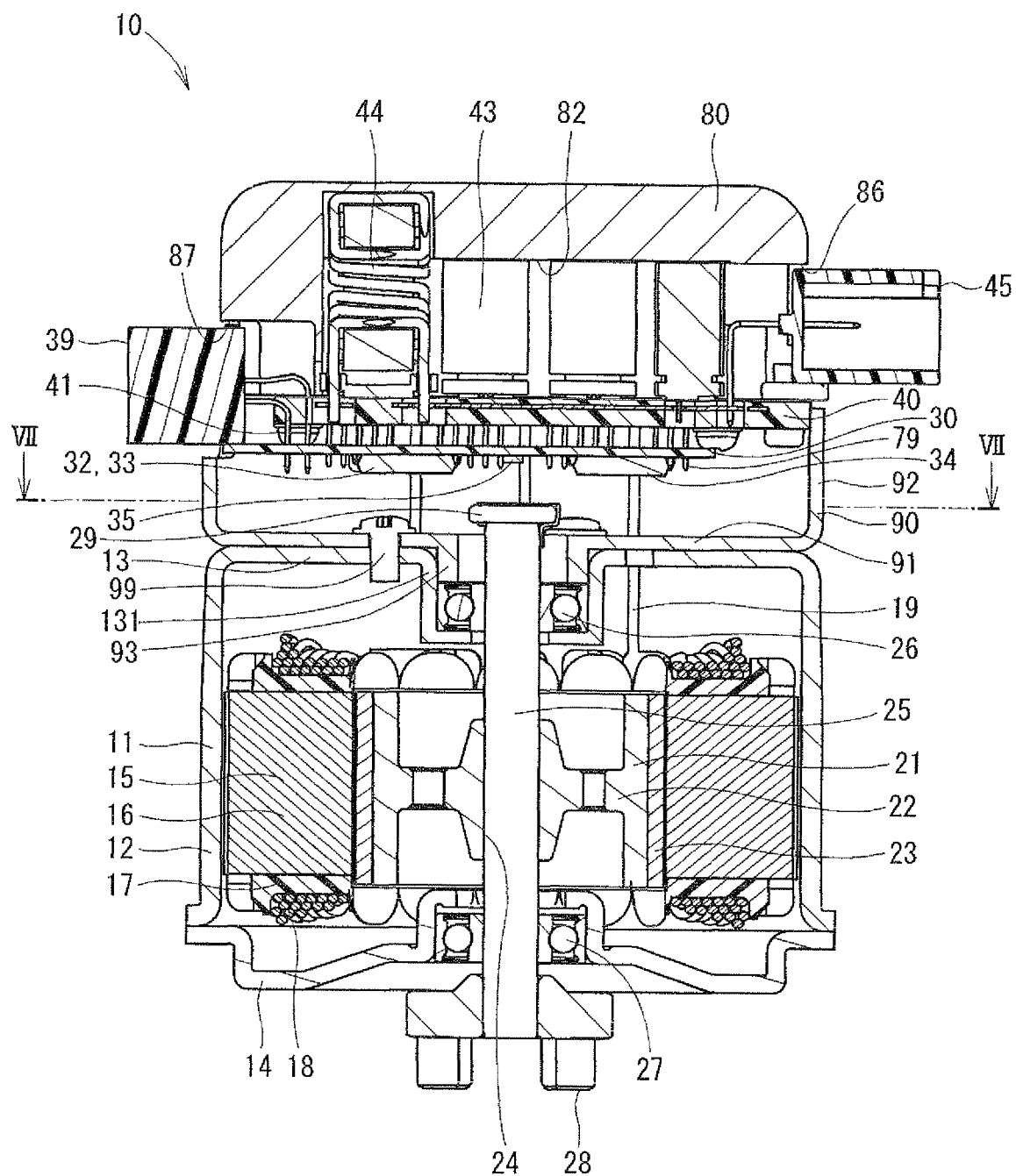
FIG. 1 is a schematic cross sectional view showing an electric motor device according to a first embodiment of the present invention.

The present invention will be explained by way of multiple embodiments with reference to the drawings.

First Embodiment

An electric motor device according to a first embodiment of the present invention is shown in FIGS. 1 to 15. The electric motor device 10 is a brushless motor used for an electric power steering device for a vehicle. As shown in FIG. 2, the electric motor device 10 is engaged with a gear 2 of a column shaft 1 and rotated in a forward or backward direction in accordance with a vehicle speed signal transmitted through CAN and so on as well as a torque signal from a torque sensor 4, which detects a steering torque generated by an operation of a steering wheel 3 by a vehicle driver, so that an assisting power is generated for the steering operation.

Figure 2:
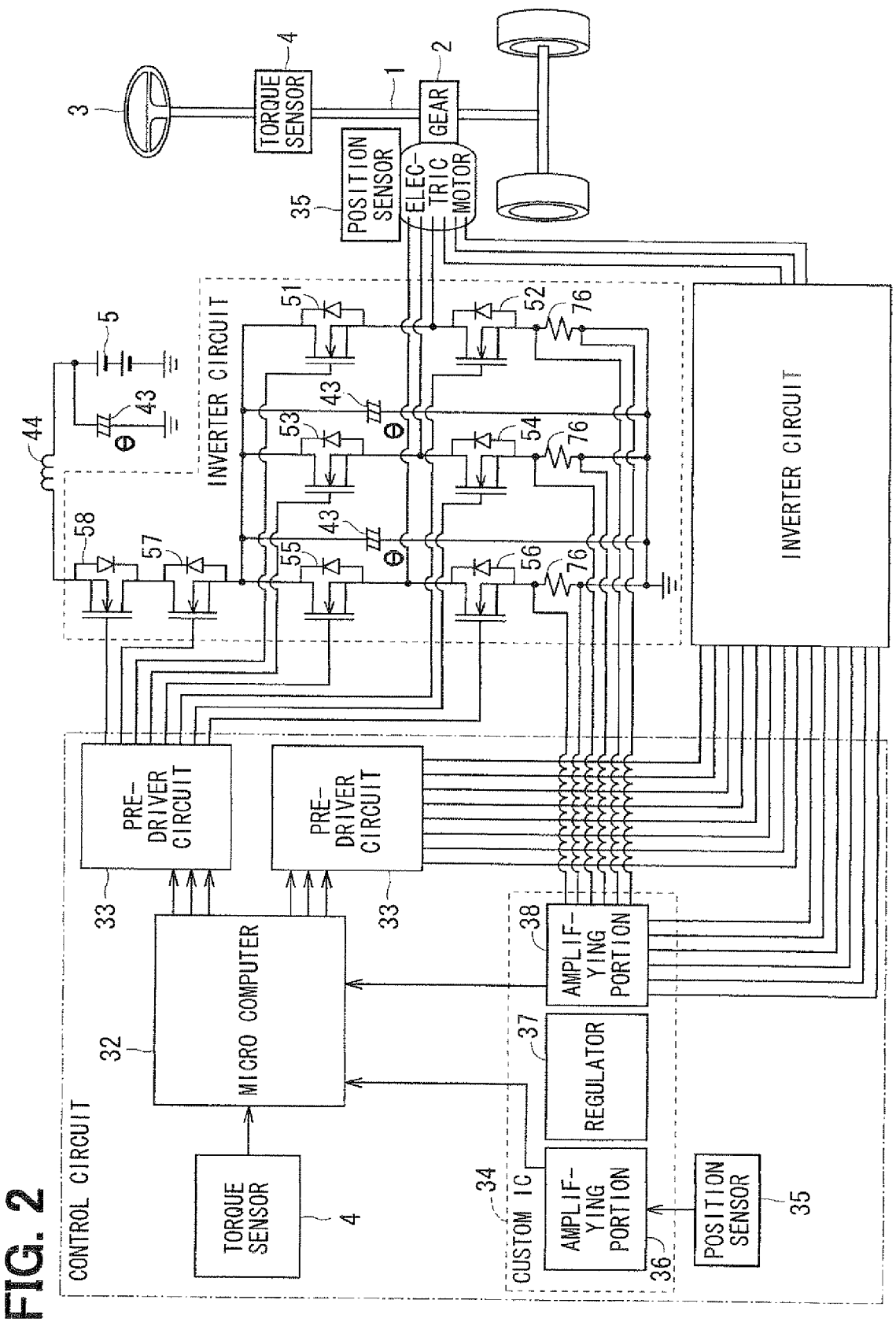
FIG. 2 is a control circuit diagram of the electric motor device according to the first embodiment.
Figure 3:
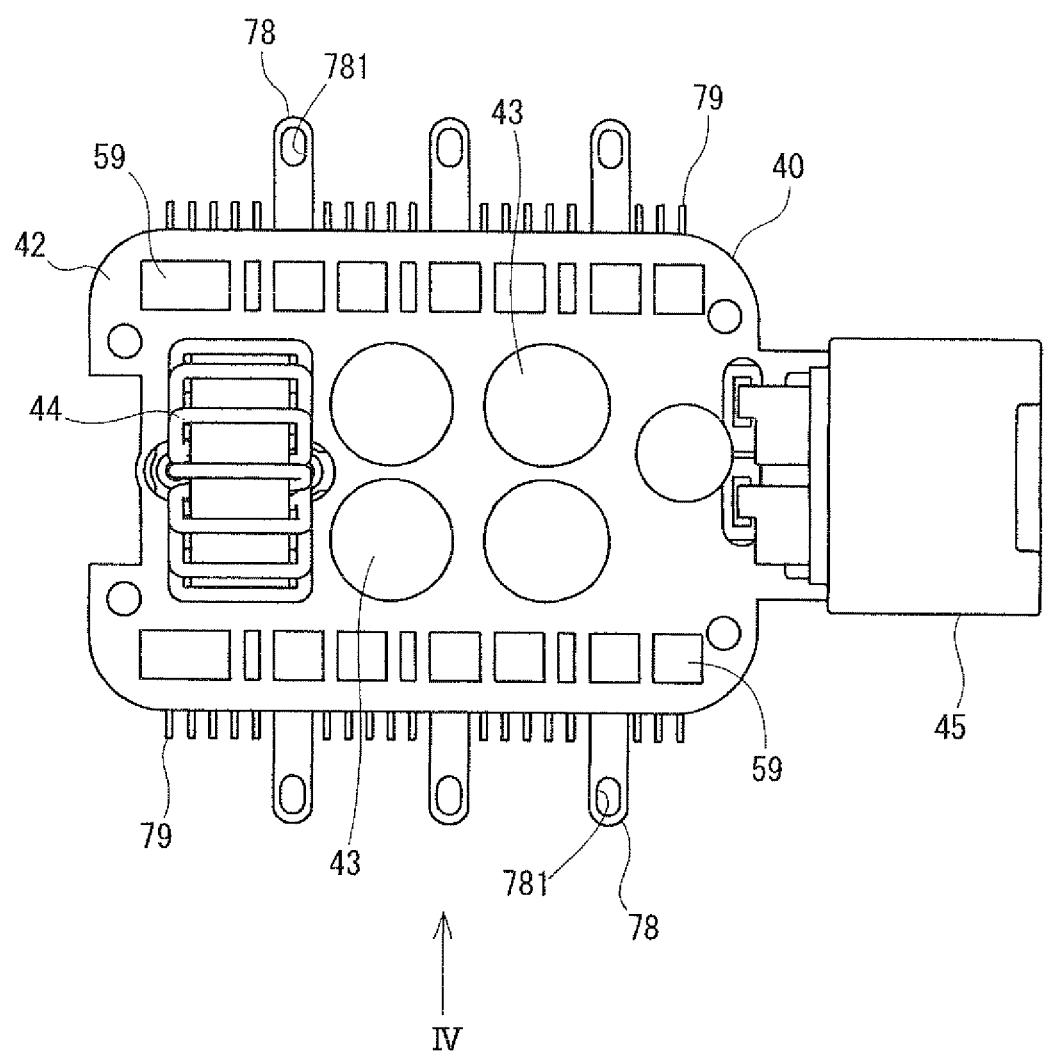
FIG. 3 is a schematic plan view showing a power module and electronic parts for the electric motor device.

As shown in FIG. 1, the electric motor device 10 is composed of an electric motor and a controller, which are connected to each other by an intermediate member 90. The electric motor is composed of a motor casing 11, a stator 15, a rotor 21, a rotating shaft 25 and so on. The controller is composed of a control board 30, a power module 40, a heat sink 80 and so on.

The electric motor is further explained. The motor casing 11 is, for example, made of iron sheet by press working and formed in a cylindrical shape having a bottom. The motor casing 11 has a cylindrical wall portion 12 and an axial end plate 13 extending from an axial end (an upper end in FIG. 1) of the cylindrical wall portion 12 in a radial inward direction. A frame end plate 14 of a disc shape closes an open end of the motor casing 11, which is another axial end of the cylindrical wall portion 12 opposite to the axial endplate 13. For example, the frame endplate 14 is also made of iron sheet by press working.

The stator 15 is fixed to the motor casing 11 at an inner peripheral surface of the cylindrical wall portion 12. The stator 15 has multiple projecting poles 16 and multiple slots (not shown), which are alternately arranged in a circumferential direction. Insulators 17 are inserted into each of the slots and then stator coils 18 are wound on each of the projecting poles 16, namely on each of the insulators 17. The stator coils 18 form two systems of three-phase windings. Connecting lead wires 19 extend from the stator coils 18 toward the controller.

The rotor 21 is rotatably arranged in a radial inside of the stator 15. The rotor 21 has multiple permanent magnets 23 at an outer periphery of a rotor core 22, wherein different magnetic poles (N and S poles) of the permanent magnets 23 are alternately arranged in a circumferential direction. The rotating shaft 25 is inserted into a center through-hole 24 formed in the rotor 21, so that the rotating shaft 25 is fixed to the rotor 21. One axial end of the rotating shaft 25 is supported by a bearing 26 fixed to the axial endplate 13 of the motor casing 11, while the other axial end thereof is supported by another bearing 27 fixed to the frame end plate 14. The rotating shaft 25 is thereby rotatably supported by the motor casing 11 and the frame end plate 14. A size of the stator 15 as well as the rotor 21 in an axial direction is decided depending on a required output for the electric motor.

According to the above structure, when electric power is supplied to the stator coils 18, rotating magnetic field is generated, so that the rotor 21 and the shaft 25 rotate in a forward or backward direction with respect to the stator 15 and the motor casing 11. A driving portion 28 is provided at the lower end of the rotating shaft 25, wherein the driving portion 28 is engaged with the gear 2 of the column shaft 1 so that a driving force generated at the electric motor is transmitted to the gear 2.

Now, the controller will be explained. The control board 30, the power module 40 and the heat sink 80 are arranged in this order at the upper side of the rotating shaft 25. A choke coil 44 and aluminum electrolyte capacitors 43 are arranged on the power module 40 in such a way that they extend in a board thickness direction of the power module 40 and they are electrically connected to wires formed on the power module 40. The power module 40 is connected to the heat sink 80 by means of screws 41. The control board 30 is also fixed to the heat sink 80 by means of screws (not shown) and electrically connected to signal wires 79 of the power module 40 by means of soldering or welding.

Figure 6:
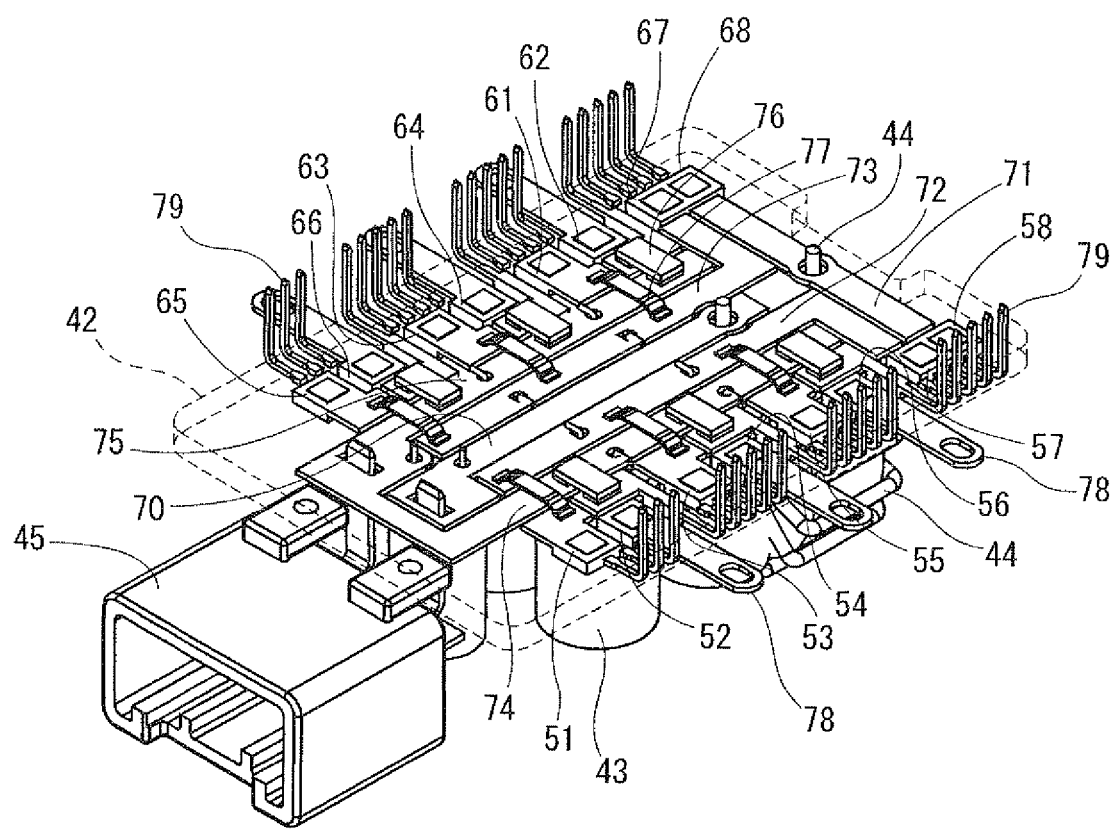
FIG. 6 is a schematic perspective view showing the power module and electronic parts for the electric motor device, wherein a resin molded portion is removed.
Figure 7:
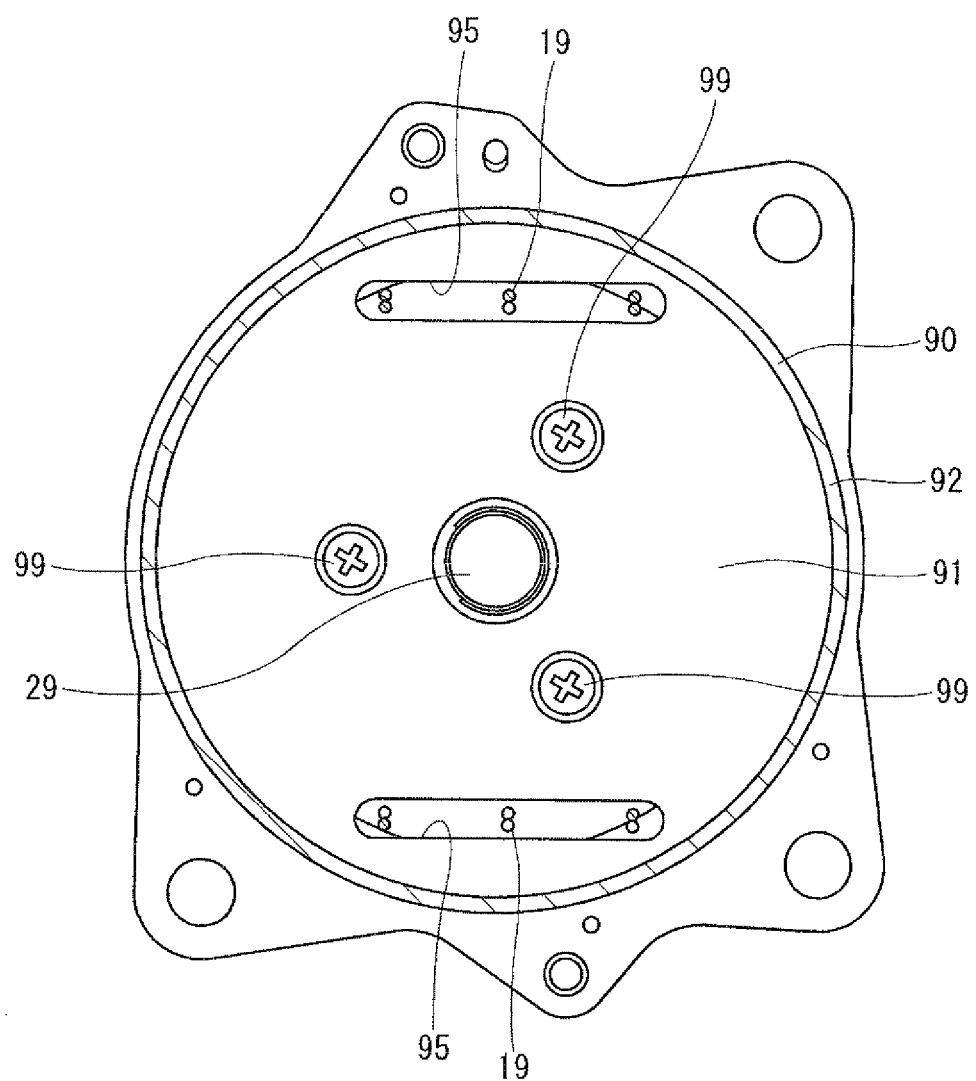
FIG. 7 is a cross sectional view taken along a line VII-VII in FIG. 1.

A structure of the power module 40 is further explained with reference to FIGS. 3 to 6. In FIG. 6, a molded resin 42 is indicated by a dotted line.

The power module 40 is composed of twelve power transistors 51-56 and 61-66, four power transistors 57, 58, 67 and 68 for circuit protection, wiring plates 70 to 75 for connecting the power transistors 51-58 and 61-68, shunt resisters 76, jumper wires 77 and so on. Those parts and components constitute two sets of inverter circuits and are resin-molded in a rectangular plate shape.

The power transistors 51-58 and 61-68 are arranged on the same plane and form the two sets of the inverter circuits. The eight power transistors 51-58 of one set of the inverter circuit are arranged in a line extending in a longitudinal direction on a side of the power module 40, as shown in FIG. 6, while the other eight power transistors 61-68 of the other set of the inverter circuit are likewise arranged in a line on another side of the power module 40.

Heat radiating plates 59 for the respective power transistors 51-58 and 61-68 are exposed to the outside of the molded resin 42 at an upper surface thereof (a surface in a thickness direction of the molded resin 42 for the power module 40). The heat sink 80 is tightly in contact with the heat radiating plates 59 via a heat radiating sheet (not shown) of insulating material.

Multiple terminals 78 as well as multiple signal lead wires 79 connected to the power transistors 51-58 and 61-68 are outwardly projecting from outer side surfaces (extending in the longitudinal direction) of the power module 40. The terminals 78 are electrically connected to the respective connecting lead wires 19 of the stator coils 18. The signal lead wires 79 are electrically connected to the respective lead wires and/or wiring plates formed on the control board 30.

Figure 4:
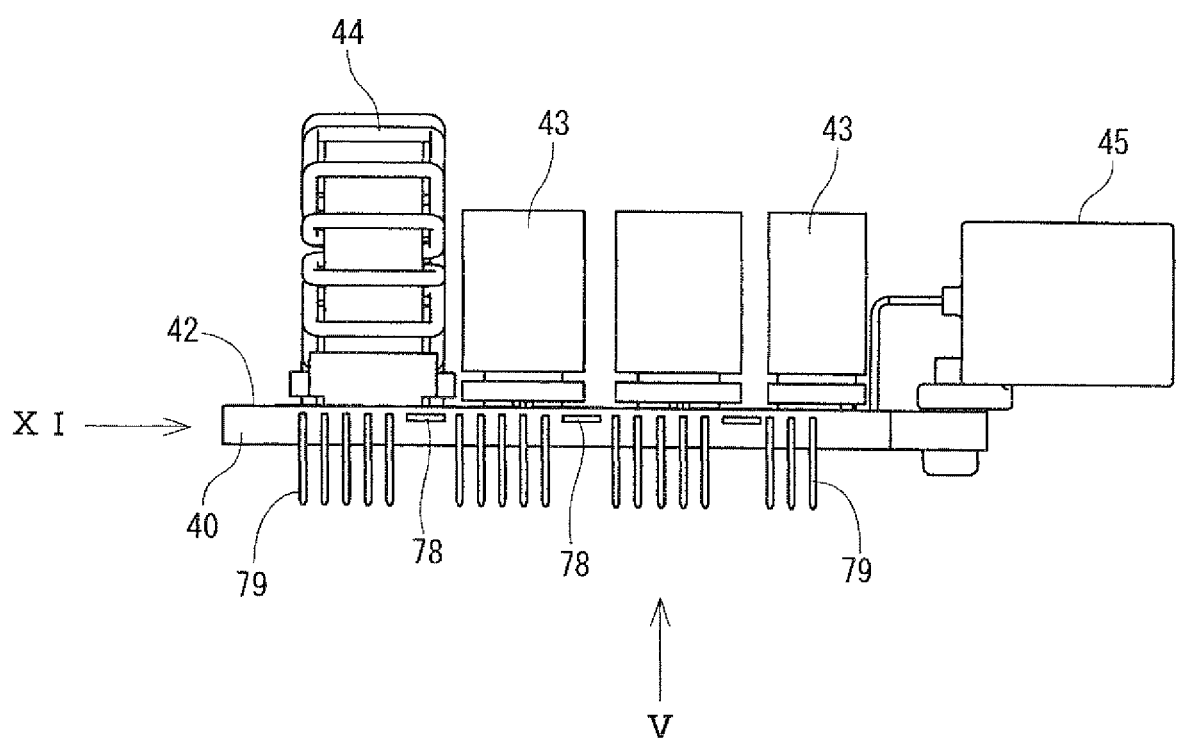
FIG. 4 is a schematic side view showing the power module and electronic parts for the electric motor device.
Figure 5:
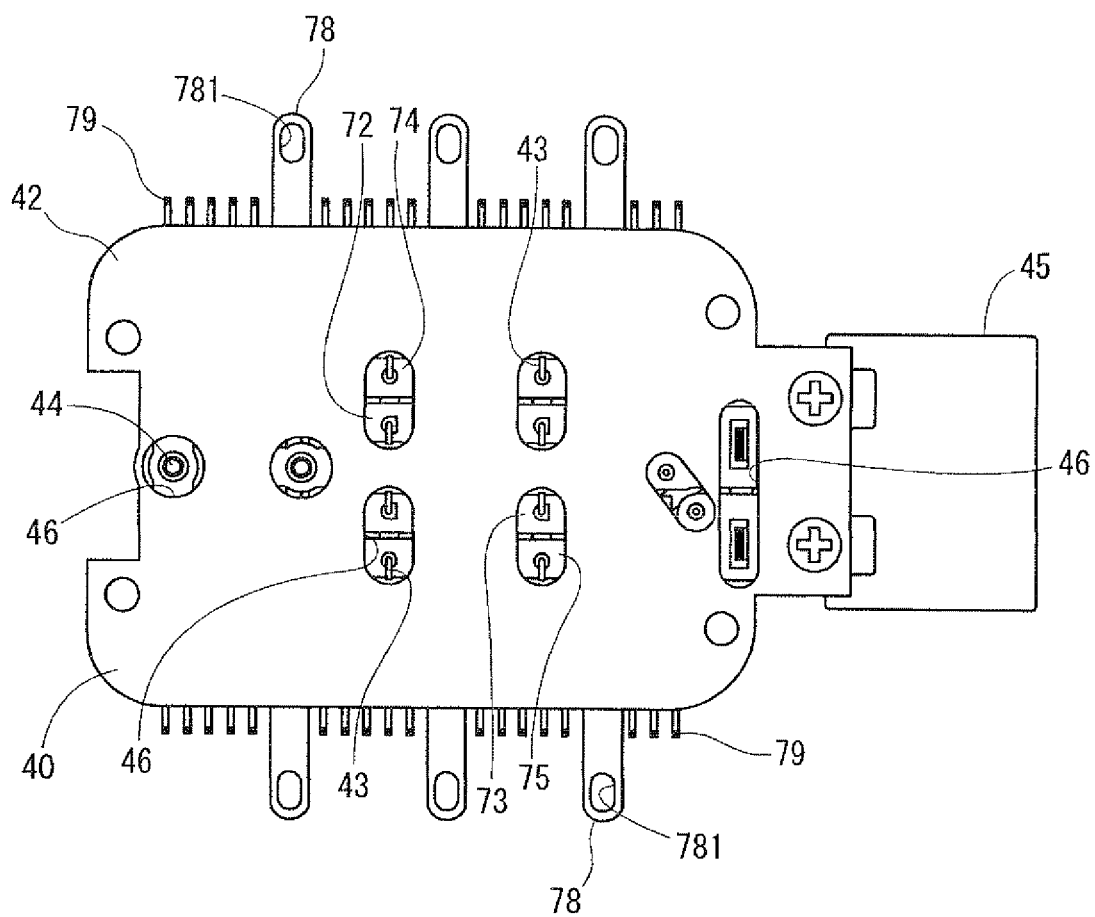
FIG. 5 is a schematic bottom plan view showing the power module and electronic parts for the electric motor device.

The aluminum electrolyte capacitors 43 and the choke coil 44, which are electronic parts, are arranged on the power module 40 in such a way that they extend in the board thickness direction of the power module 40, as best shown in FIG. 4. The aluminum electrolyte capacitors 43 are electrically connected to the respective wiring plates 72 to 75 so as to absorb ripple current, which may be generated by switching operations of the power transistors 51-58 and 61-68. The choke coil 44 is electrically connected to the wiring plates 70 and 71 so that current fluctuation, which may be applied to the power transistors 51-58 and 61-68, may be attenuated.

A first connector 45 is connected at a longitudinal end of the power module 40. The first connector 45 is outwardly projected from an opening portion 86 formed in the heat sink 80. Electrical power is supplied to the power module 40 from a battery 5 via the first connector 45.

The electric current supplied to the first connector 45 from the battery 5 flows from the center wiring plate 70 to the choke coil 44 and then to the wiring plate 71, which is provided at an opposite side of the first connector 45. The electric current further flows from the wiring plate 71 to the wiring plates 72 and 73 arranged at both sides of the center wiring plate 70 through the respective power transistors 57, 58, 67, 68 for the circuit protection. The power transistors 57, 58, 67 and 68 are arranged at both sides of the power module 40. The electric current further flows from the wiring plates 72 and 73 to the respective terminals 78 via the jumper wires 77 and the power transistors 51, 53, 55, 61, 63, 65 of a power-source side. Then, the electric current flows to the stator coils 18 from the terminals 78 through the connecting lead wires 19.

The electric current from the stator coils 18 flows to the wiring plates 74 and 75, which are arranged between the wiring plates 72 and 73 and the power transistors 51-56 and 61-66, through the respective terminals 78, the power transistors 52, 54, 56, 62, 64, 66 of a ground side, and the shunt resisters 76. The electric current finally flows back from the wiring plates 74 and 75 to the battery 5 via the first connector 45.

The inverter circuits formed in the power module 40 are shown in FIG. 2. In FIG. 2, one set of the inverter circuit (a first inverter circuit), which is composed of six power transistors 51 to 56 and so on, is indicated in detail, while the other set of the inverter circuit (a second inverter circuit) is simply indicated by a block. Three phase alternating current is respectively produced by the two sets of the inverter circuits and supplied to the stator coils 18, which form the three-phase windings of two systems.

Since the power transistors 51-58 and 61-68 and the wiring plates 70 to 75 are arranged as explained above, length of the wiring plates 70 to 75 can be made shorter and thereby a size of the power module 40 can be made smaller. The size (the length) of the power module 40 in the longitudinal direction is made smaller than the outer diameter of the motor casing 11 by a thickness of the intermediate member 90 (FIG. 1).

As shown in FIG. 1 and FIGS. 11 to 15, the heat sink 80 is made of such material having high heat conductivity, for example, aluminum, and has a cubic volume having a heat capacity for absorbing heat generated at the power module 40, which varies depending on output of the electric motor.

Figure 11:
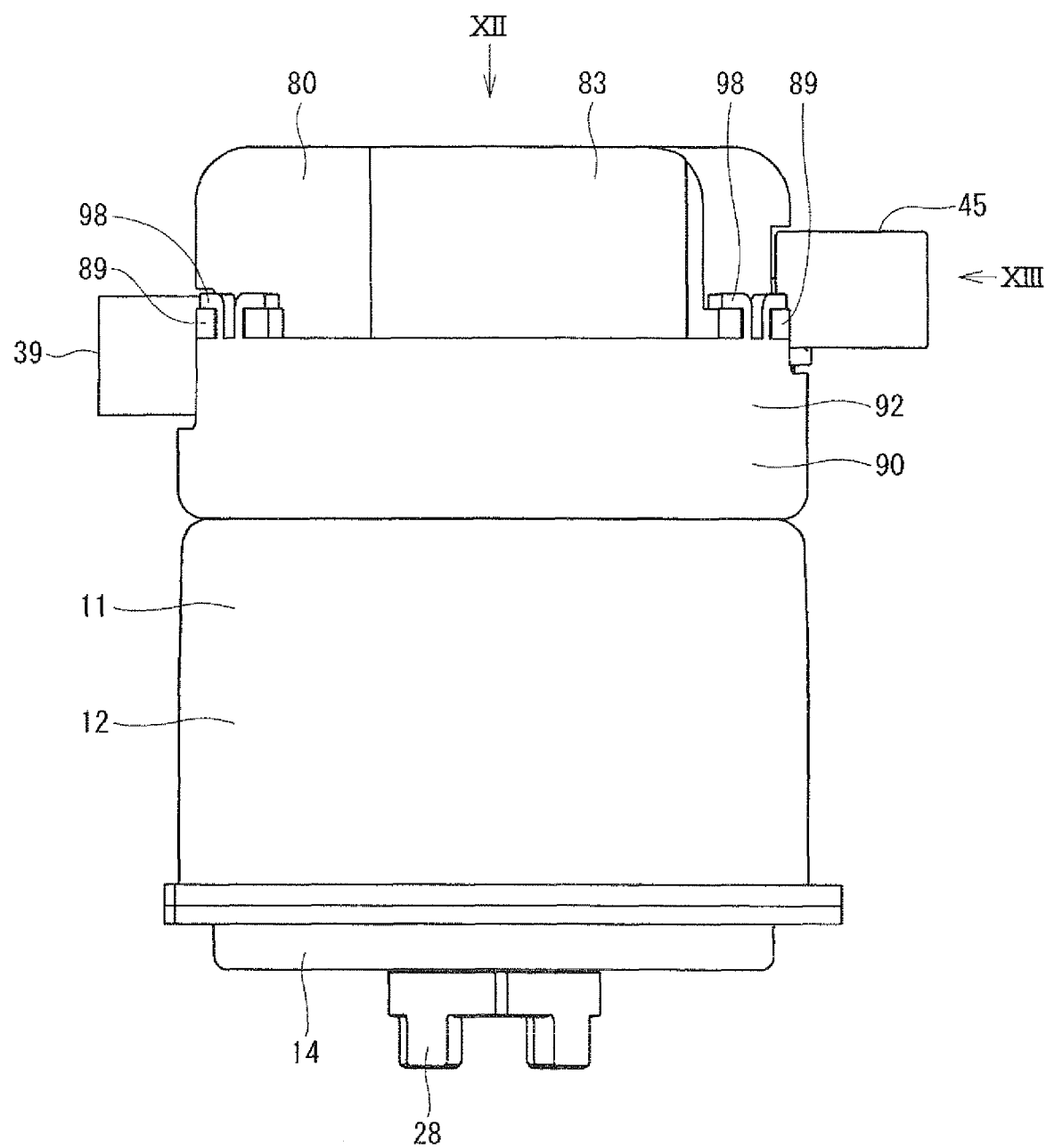
FIG. 11 is a schematic side view showing the electric motor device of the first embodiment.
Figure 12:
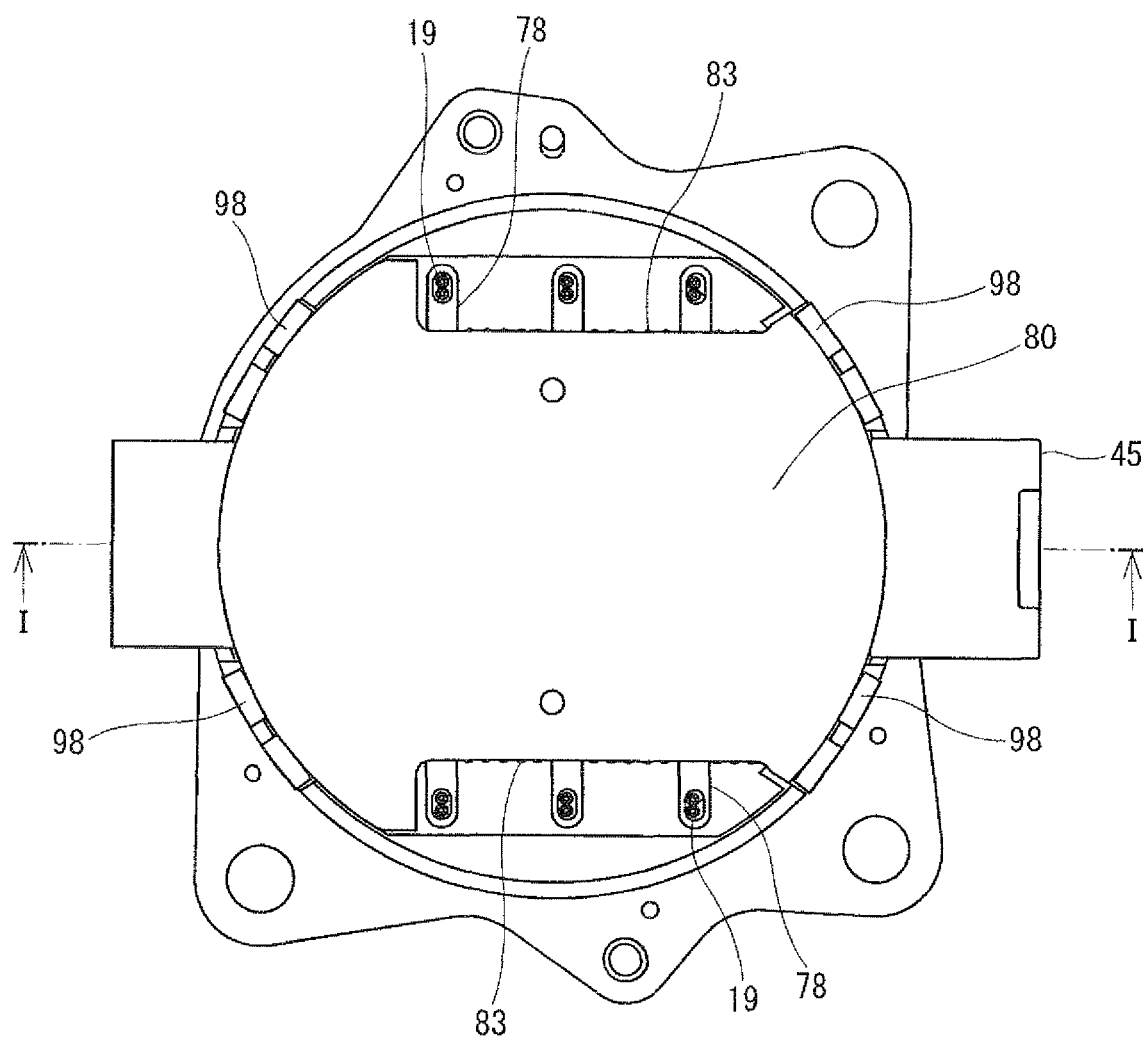
FIG. 12 is a schematic plan view showing the electric motor device when viewed in a direction XII in FIG. 11.
Figure 13:
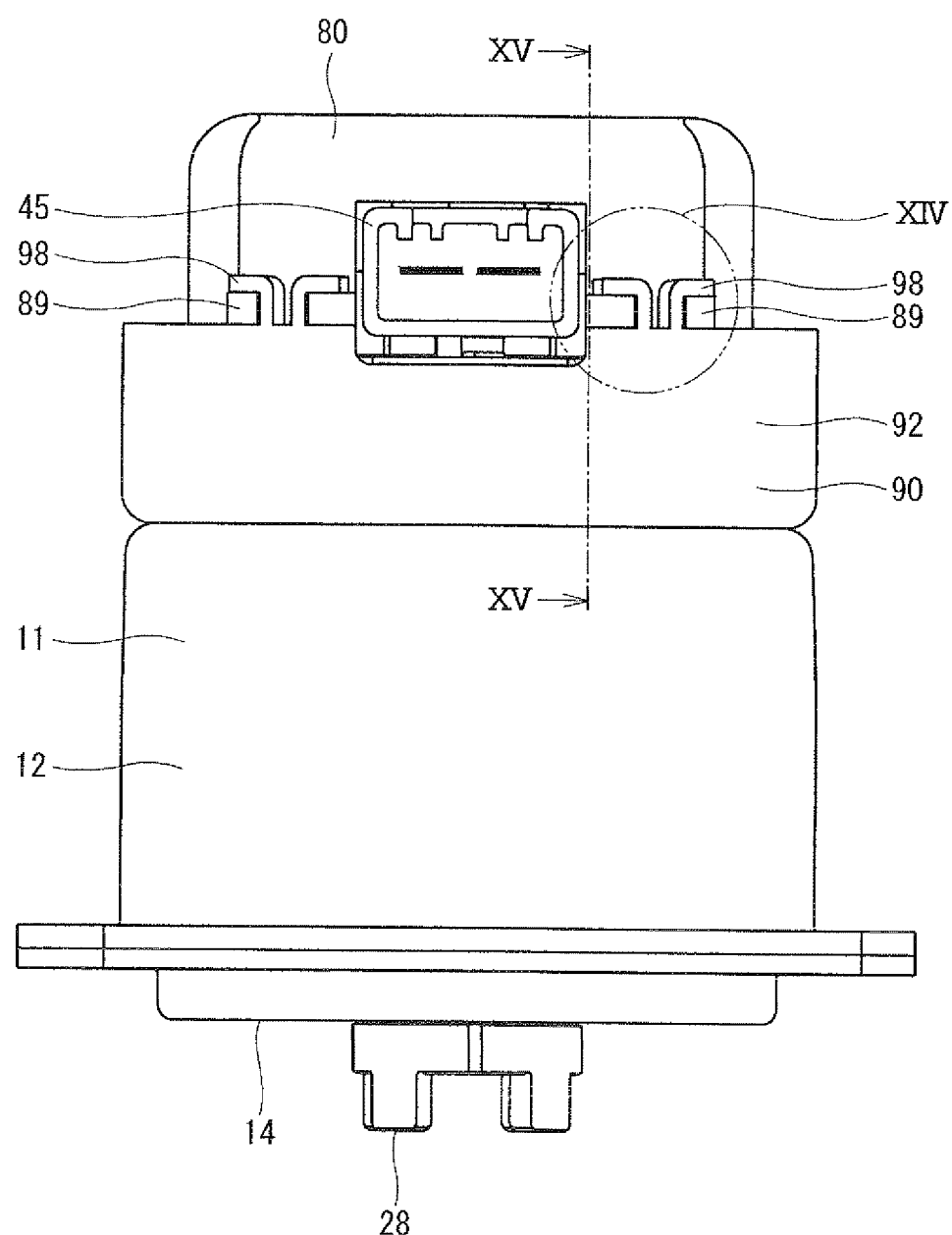
FIG. 13 is a schematic side view showing the electric motor device when viewed in a direction XIII in FIG. 11.
Figure 14:
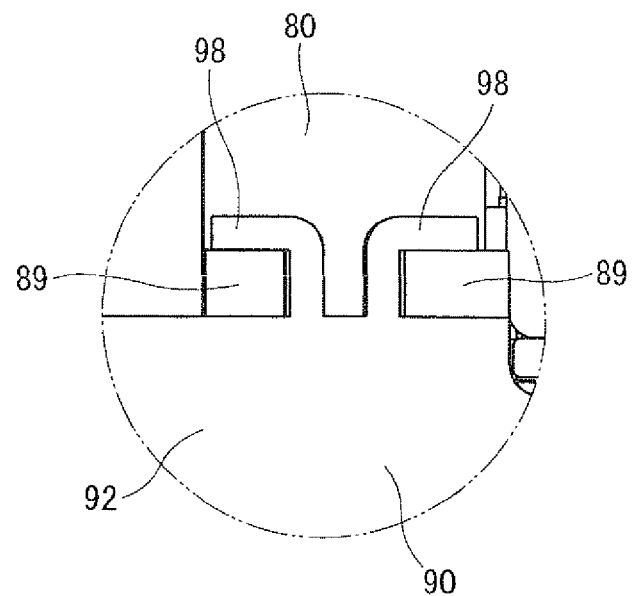
FIG. 14 is an enlarged schematic view showing a portion circled by a two-dot-chain line XIV in FIG. 13.

The heat sink 80 has a recessed portion 82 for accommodating the aluminum electrolyte capacitors 43 and the choke coil 44. The heat sink 80 has flat surface portions (cut-out portions) 83 at both sides, as shown in FIGS. 11 and 12, wherein a distance between the flat surface portions 83 is almost equal to a width of the power module 40, so that the terminals 78 are outwardly projected from the flat surface portions 83. Each of the terminals 78 is electrically connected to the respective connecting lead wires 19 of the stator coils 18.

Furthermore, the heat sink 80 has opening portions 86 and 87 at such positions corresponding to the first connector 45 of the power module 40 and a second connector 39 of the control board 30.

Figure 15:
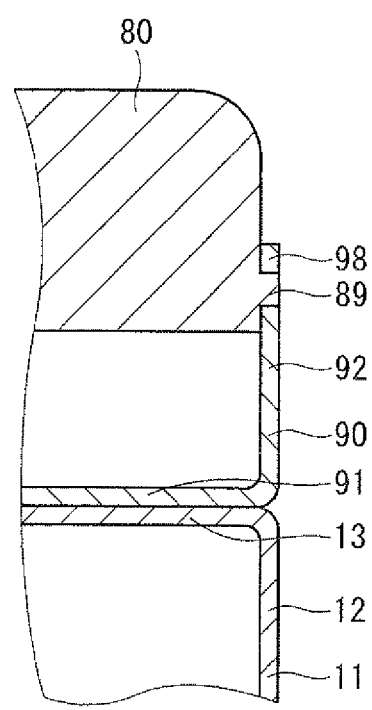
FIG. 15 is a cross sectional view taken along a line XV-XV in FIG. 13.

As shown in FIG. 15, an outer diameter of the heat sink 80 is made smaller than a cylindrical side wall 92 of the intermediate member 90 by the thickness thereof, so that an outer peripheral surface of heat sink 80 is in contact with an inner surface of the intermediate member 90. As a result, the heat sink 80 is coaxially arranged with the intermediate member 90.

Figure 10:
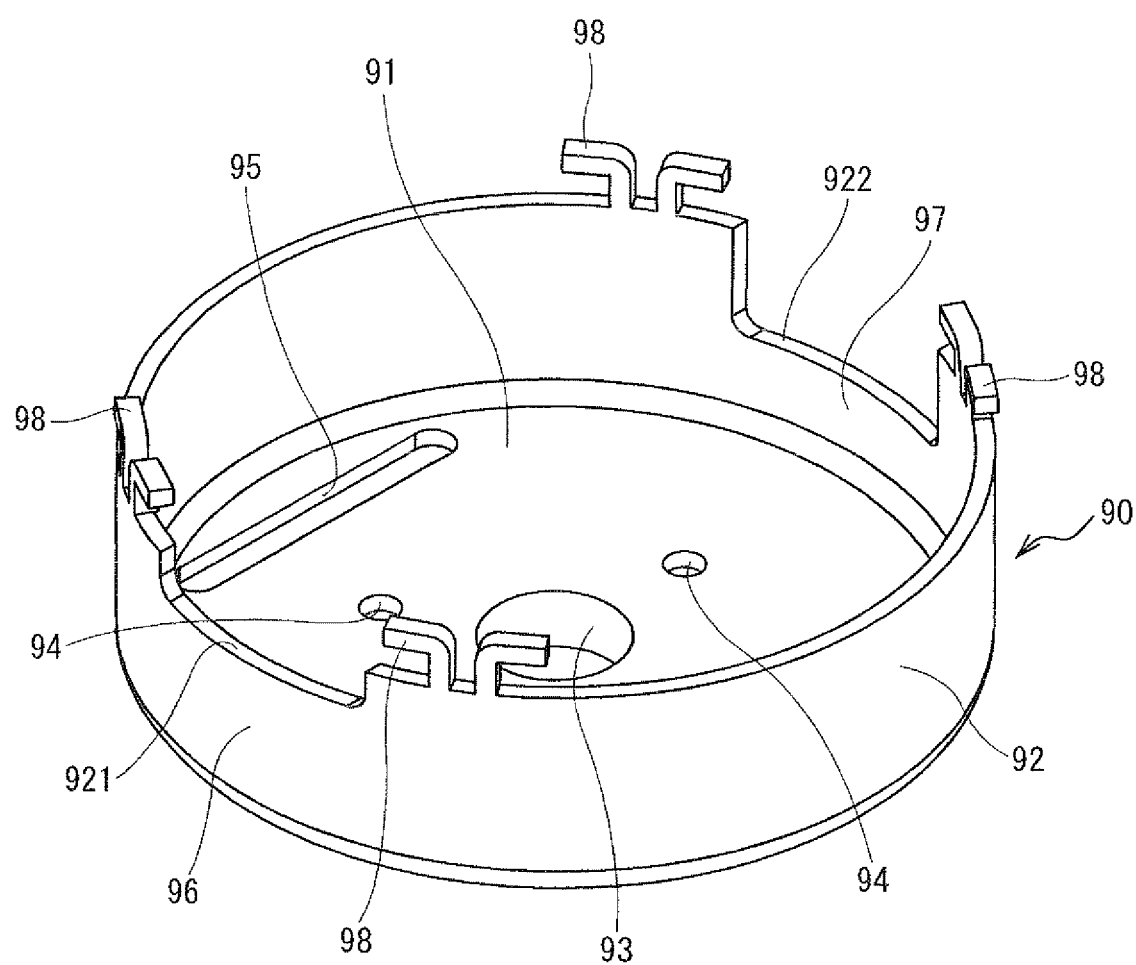
FIG. 10 is a schematic perspective view showing the intermediate member.

Multiple projections 89, which are outwardly extending in the radial direction, are formed at the outer peripheral surface of the heat sink 80. Each of the projections 89 is in contact with an upper end of the side wall 92, so that a distance between the heat sink 80 and the motor casing 11 in the axial direction is maintained at a predetermined value. As explained below, a reference numeral 98 in FIG. 15 is a claw portion, which is best shown in FIG. 10.

As shown in FIG. 1, the control board 30 is provided in parallel to the power module 40 on a side of the power module 40 closer to the motor casing 11. The control board 30 is made of, for example, glass epoxy resin, and fixed to the heat sink 80 by screws (not shown). The control board 30 is electrically connected to the signal lead wires 79 extending from the power module 40.

The second connector 39 is connected to the control board 30 at a position opposite to the first connector 45 connected to the power module 40. The second connector 39 outwardly projects from the opening portion 87 formed in the heat sink 80.

A micro computer 32, pre-driver circuits 33, a custom IC 34, a position sensor 35 are mounted on the control board 30. The position sensor 35 is mounted on the control board 30 on a side closer to the motor casing 11. The position sensor 35 outputs a signal depending on a direction of magnetic field generated by a permanent magnet 29, which is attached to an upper end of the rotating shaft 25.

As shown in FIG. 2, the custom IC 34 includes an amplifying portion 36 for amplifying the signal from the position sensor 35, a regulator 37 and another amplifying portion 38 for detecting current. The custom IC 34 forms a function block. The signal from the position sensor 35 is amplified by the amplifying portion 36 and then inputted to the micro computer 32, so that the micro computer 32 detects a position of the rotor 21 fixed to the rotating shaft 25.

A torque signal outputted from the torque sensor 4 is also inputted to the micro computer 32 via the second connector 39. The detecting current flowing through the shunt resisters 76, which correspond to current for the inverter circuit, is amplified by the amplifying portion 38 and inputted to the micro computer 32.

The micro computer 32 outputs pulse signals to the power transistors 51-56 and 61-66 through the pre-driver circuits 33 based on the signals from the position sensor 35, the torque sensor 4, the shunt resistors 76 and so on, in order to assist the steering operation of the steering wheel 3 depending on a vehicle speed. The pulse signals are produced by PWM control. Each of the inverter circuits, which is composed of the power transistors, converts the electric current supplied from the battery 5 via the choke coil 44 and the power transistors 57, 58 and 67, 68 for the circuit protection into the three phase alternating current, which is then supplied to the stator coils 18 through the connecting lead wires 19 connected to the terminals 78.

As shown in FIG. 1 and FIGS. 7 to 10, the intermediate member 90 is made of an iron sheet by press working and formed in a cylindrical shape having a bottom. The intermediate member 90 has a bottom plate portion 91 and the cylindrical side wall 92. The bottom plate portion 91 of the intermediate member 90 is fixed to the axial endplate 13 of the motor casing 11, while the cylindrical side wall 92 is connected to the heat sink 80.

A first cylindrical portion 131 is formed at the axial end plate 13 of the motor casing 11, such that the first cylindrical portion 131 extends in an axially downward direction of the motor casing 11. A second cylindrical portion 93 is formed at a center of the bottom plate portion 91, such that the second cylindrical portion 93 extends in an axially downward direction of the intermediate member 90. As a result, an outer peripheral surface of the second cylindrical portion 93 is brought into contact with an inner peripheral surface of the first cylindrical portion 131, so that the intermediate member 90 is coaxially arranged with the motor casing 11.

Multiple (three) through-holes 94 are formed at the bottom plate portion 91 of the intermediate member 90. Three screws (or bolts) 99 are respectively inserted into the through-holes 94, so that the intermediate member 90 is fixed to the motor casing 11. Two slit portions 95, through which each of the connecting lead wires 19 passes, are also formed at the bottom plate portion 91 of the intermediate member 90.

A first and a second notch portion 921 and 922 (FIG. 10) are formed in the side wall 92 of the intermediate member 90 at such portions respectively corresponding to the first connector 45 of the power module 40 and the second connector 39 of the control board 30. A part of the side wall 92 formed between the bottom plate portion 91 and the first notch portion 921 is a first protection wall 96 for preventing extraneous material from coming into the controller through a gap between the first connector 45 and the motor casing 11. Likewise, a part of the side wall 92 formed between the bottom plate portion 91 and the second notch portion 922 is a second protection wall 97 for preventing extraneous material from coming into the controller through a gap between the second connector 39 and the motor casing 11.

Figure 8:
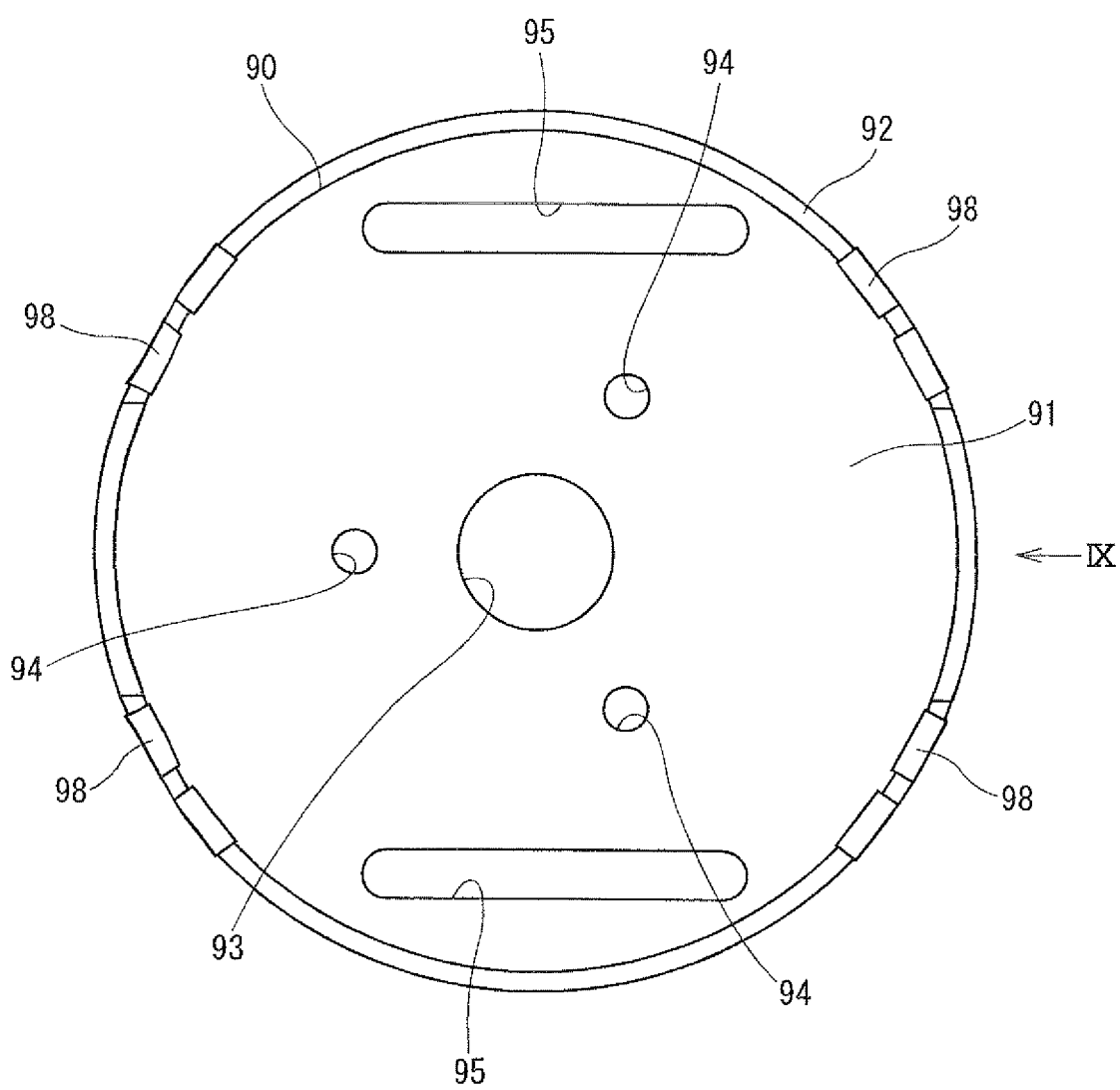
FIG. 8 is a schematic plan view showing an intermediate member for the electric motor device.
Figure 9:
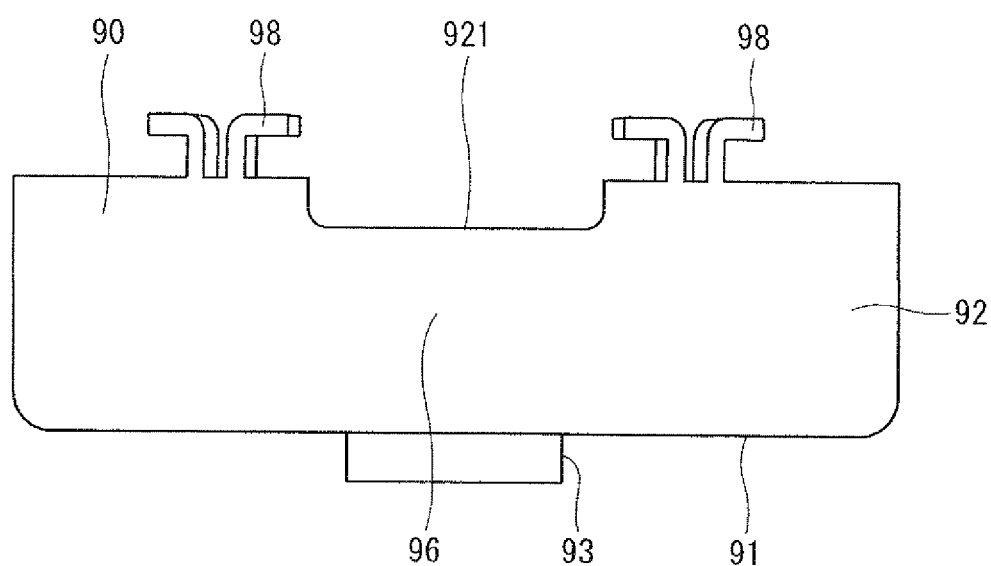
FIG. 9 is a schematic side view showing the intermediate member when viewed in a direction IX in FIG. 8.

Four pairs of claw portions 98, each of which extends upwardly in the axial direction of the intermediate member 90, are formed at the upper end of the side wall 92 of the intermediate member 90. In FIGS. 8 to 10, each of the claw portions 98 is indicated in a condition that it is bent in a circumferential direction of the intermediate member 90 so as to firmly fix the heat sink 80 to the intermediate member 90.

As shown in FIGS. 11 to 14, the claw portions 98 are formed at such positions corresponding to the respective projections 89 of the heat sink 80. As explained above, each of the claw portions 98 is bent in the circumferential direction so that each of the projections 89 is held between the upper end of the side wall 92 of the intermediate member 90 and such bent portion of the claw portion 98. As a result, the heat sink 80 is fixed to the intermediated member 90.

An assembling process of the electric motor, the intermediate member 90 and the controller will be explained.

At first, the second cylindrical portion 93 of the intermediate member 90 is inserted into the first cylindrical portion 131 of the motor casing 11. Then, the bottom plate portion 91 of the intermediate member 90 is fixed to the axial end plate 13 of the motor casing 11 by the screws (or bolts) 99. Any extraneous material of metal, which might be produced during a fastening process by the screws (or bolts) 99, will be removed from the inside of the motor casing 11.

Then, the motor casing 11 as well as the intermediate member 90 is heated so as to be thermally expanded. The stator 15 is inserted into the cylindrical wall portion 12 of the motor casing 11, so that the stator 15 is firmly fixed to the motor casing 11 by shrinkage fitting.

The rotor 21 is firmly fixed to the rotating shaft 25 and inserted into the inside space of the stator 15. The upper end of the rotating shaft 25 is assembled to the bearing 26 attached to the inner peripheral surface of the first cylindrical portion 131 of the motor casing 11. When the frame end plate 14 is fixed to the motor casing 11, the other end of the rotating shaft 25 is assembled to the bearing 27 attached to the frame end plate 14.

Then, the heat sink 80, to which the power module 40 and the control board 30 are fixed, is assembled to the intermediate member 90. When the heat sink 80 is assembled to the intermediate member 90, the lower portion of the heat sink 80 is inserted into the intermediate member 90 so that the outer peripheral surface of the heat sink 80 is brought into contact with the inner peripheral surface of the cylindrical side wall 92 of the intermediate member 90 and the projections 89 of the heat sink 80 are brought into contact with the upper end of the cylindrical side wall 92 of the intermediate member 90. Each pair of the claw portions 98 of the intermediate member 90 is inserted into respective spaces formed between the neighboring projections 89 of the heat sink 80. Then, each of the claw portions is bent in the circumferential direction so as to firmly connect the heat sink 80 to the intermediate member 90.

Then, the connecting lead wires 19 of the stator coils 18, which extend upwardly through the slit portions 95 of the intermediate member 90 toward the heat sink 80, are connected to the respective terminals 78 of the power module 40 by soldering or welding process.

Finally, a cover member (not shown) is attached to the heat sink 80. The cover member may be formed in a cup shape. A lower end of a cylindrical wall of the cup-shaped cover member is brought into contact with the upper end of the cylindrical side wall 92 of the intermediate member 90. The assembling process for the electric motor device 10 is thus completed.

According to the present embodiment, the motor casing 11 and the heat sink 80 are connected to each other by means of the intermediate member 90 of the cylindrical shape having the bottom. The outer diameter of the side wall 92 of the intermediate member 90 is made to be almost equal to that of the cylindrical wall portion 12 of the motor casing 11. Accordingly, it becomes possible to arrange the controller (which is composed of the heat sink 80, the power module 40 and so on) on one axial side of the motor casing 11 within a space, which is not larger than the size of the motor casing 11 in the radial direction. In other words, the controller can be arranged in a space, which is within a range smaller than an outer diameter of the motor casing 11. As a result, it is possible to effectively use the above space for forming the power module 40. It is, therefore, possible to increase the space for the wiring plates 70 to 75, to increase the heat radiating performance, and thereby to increase design flexibility for the power module 40. It is further possible to increase the output of the electric motor device.

According to the present embodiment, the outer peripheral surface of the second cylindrical portion 93 of the intermediate member 90 is brought into contact with the inner peripheral surface of the first cylindrical portion 131 of the motor casing 11. In addition, the outer peripheral surface of the heat sink 80 is brought into contact with the inner peripheral surface of the cylindrical side wall 92 of the intermediate member 90. According to the above structures, the intermediate member 90 is coaxially fixed to the motor casing 11 and the heat sink 80 is coaxially fixed to the intermediate member 90. It is, therefore, possible to suppress a displacement in the radial direction between the position sensor 35 (which is mounted on the control board 30 fixed to the heat sink 80) and the permanent magnet 29 attached to the upper end of the rotating shaft 25 which is rotatably supported by the motor casing 11. Accordingly, it is possible to increase detection accuracy of the position sensor 35.

According to the present embodiment, the intermediate member 90 is fixed to the motor casing 11 by the screws (or bolts) 99 and any extraneous material is removed from the inside of the motor casing 11 before the stator 15 and the rotor 21 are assembled into the motor casing 11. Accordingly, it is possible to suppress such situation that the extraneous material may come into the motor casing 11 and thereby the operation of the stator 15 as well as the rotor 21 may be adversely affected.

According to the present embodiment, the intermediate member 90 is made of the same material of the motor casing 11. It is, therefore, possible to fix the stator 15 to the motor casing 11 by the shrinkage fitting. Therefore, the manufacturing process can be simplified. The intermediate member 90 and the motor casing 11 are not always necessary to be made of the same material, but may be made of such materials, coefficients of the thermal expansion of which are close to each other.

According to the present embodiment, the claw portions 98 of the side wall 92 are bent in the circumferential direction to hold the respective projections 89 of the heat sink 80. Therefore, the heat sink 80 can be connected to the intermediate member 90 in a simple structure.

Second Embodiment

Figure 16:
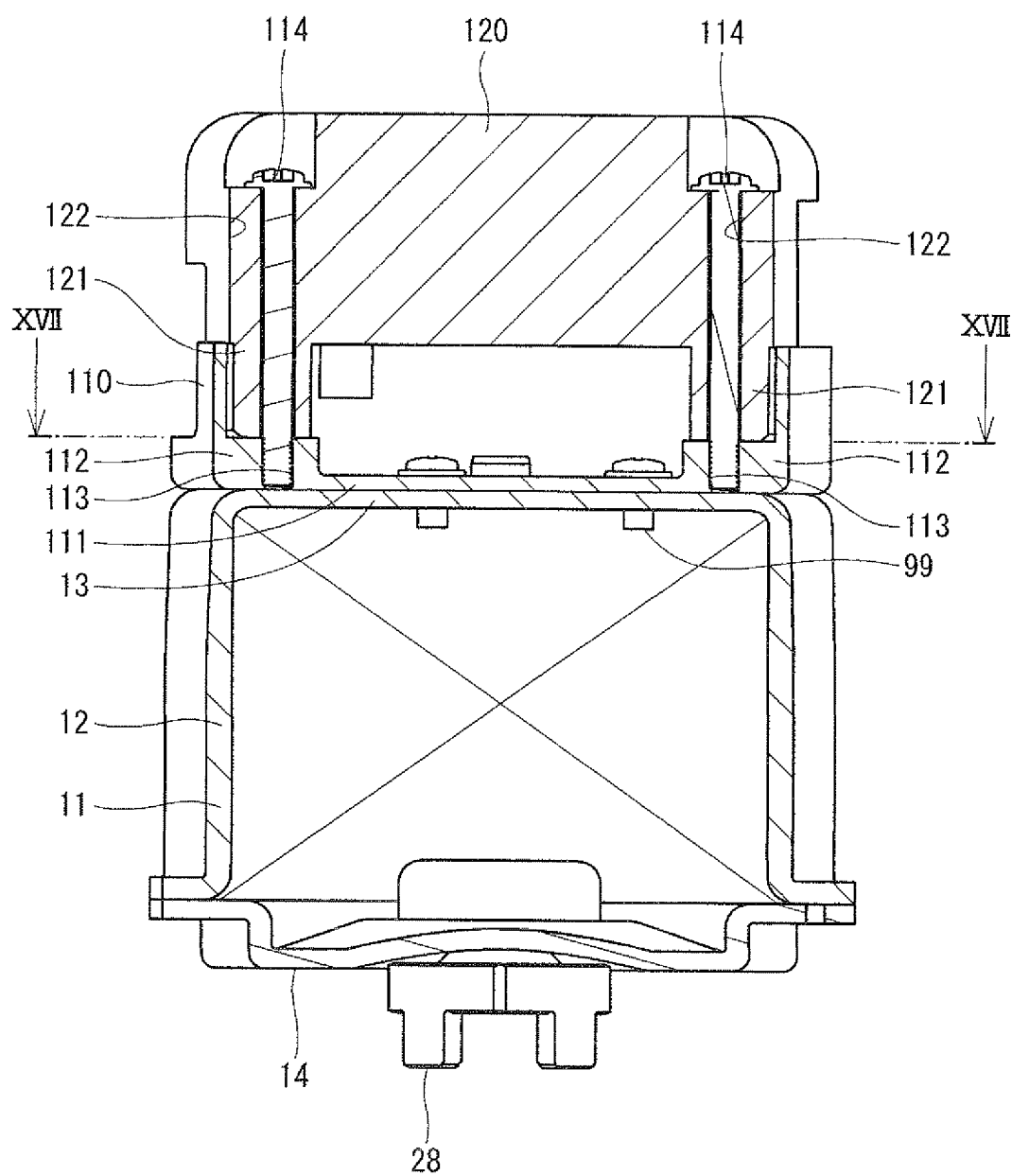
FIG. 16 is a schematic cross sectional view showing an electric motor device according to a second embodiment of the present invention.
Figure 17:
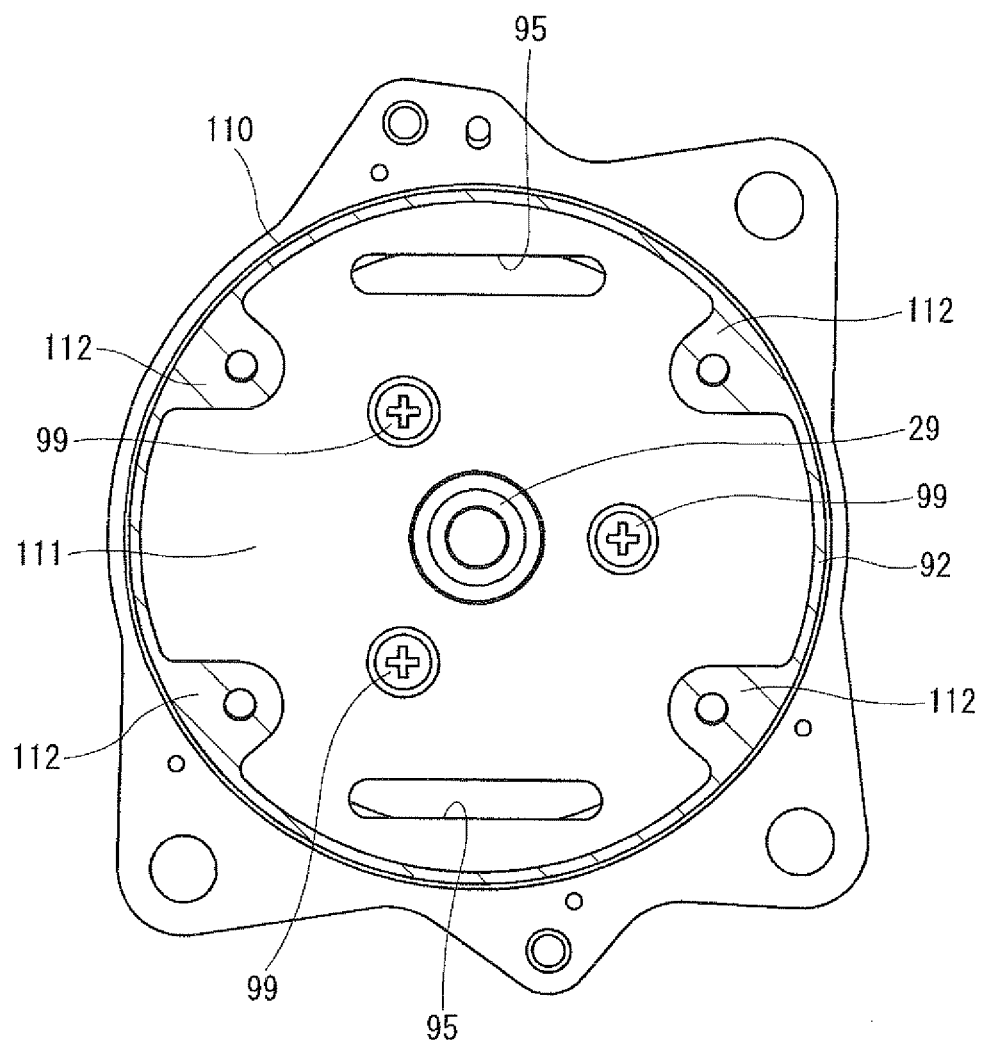
FIG. 17 is a cross sectional view taken along a line XVII-XVII in FIG. 16.
Figure 18:
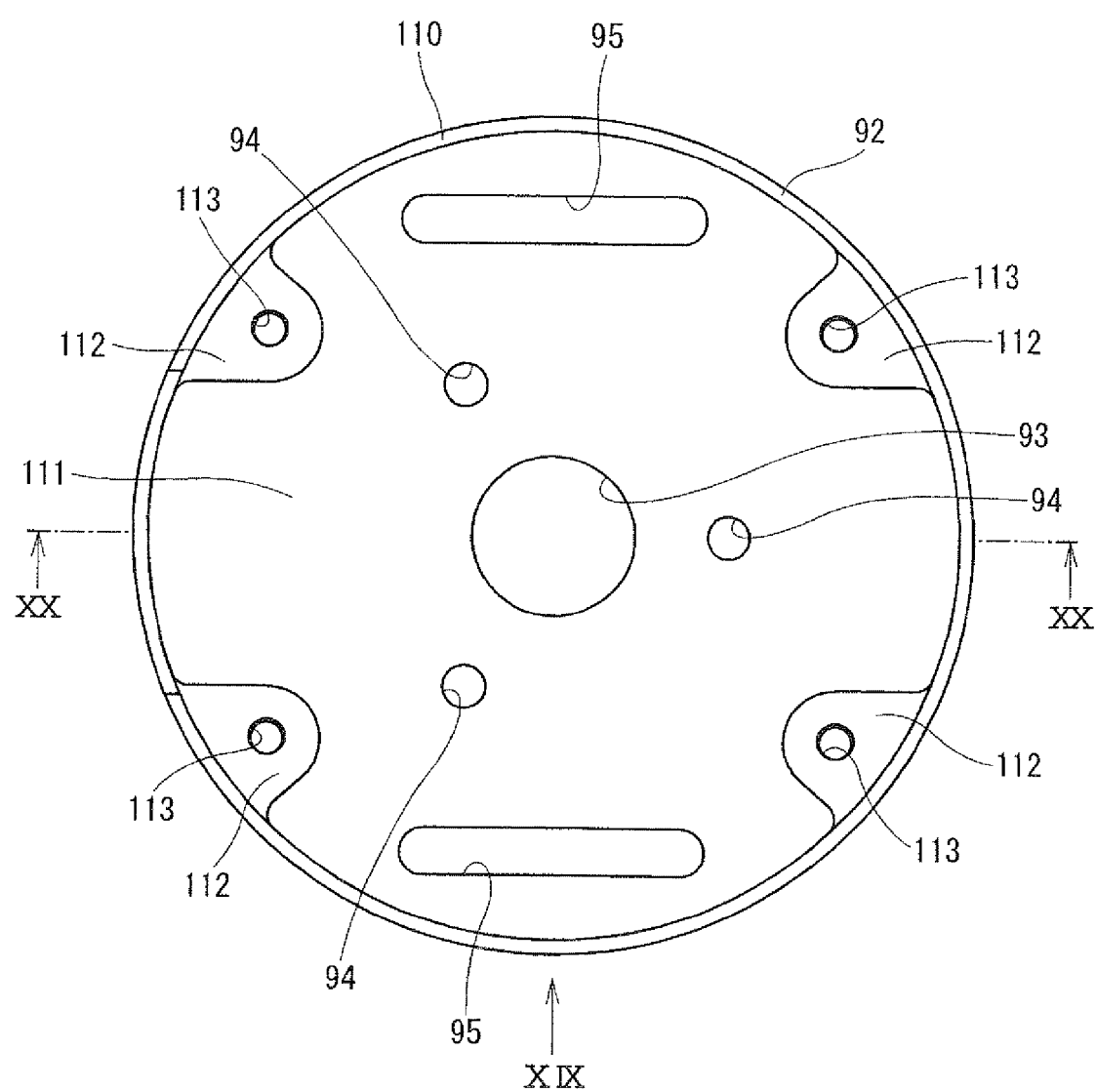
FIG. 18 is a schematic plan view showing an intermediate member for the electric motor device of the second embodiment.
Figure 19:
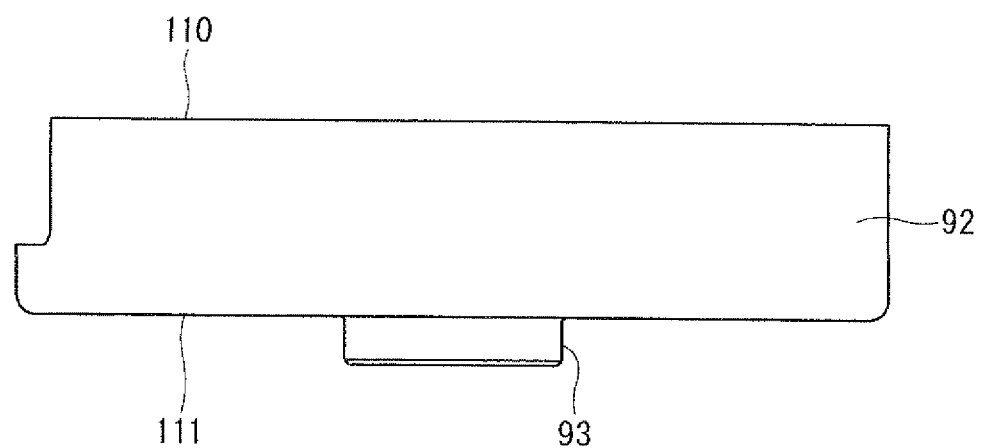
FIG. 19 is a schematic side view showing the intermediate member when viewed in a direction XIX in FIG. 18.
Figure 20:
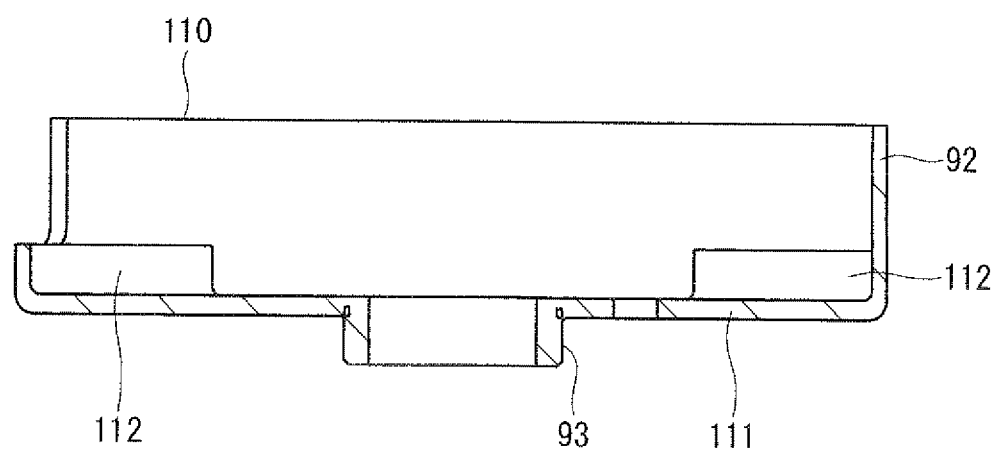
FIG. 20 is a cross sectional view taken along a line XX-XX in FIG. 18.
Figure 21:
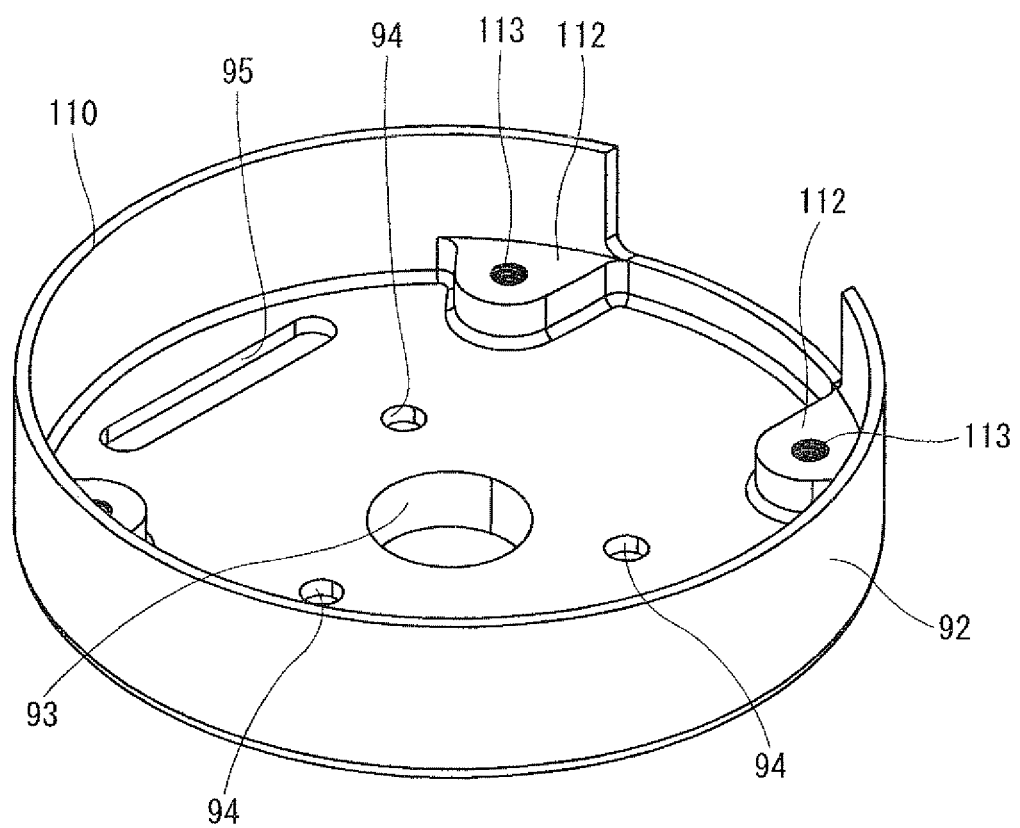
FIG. 21 is a schematic perspective view showing the intermediate member of the second embodiment.
Figure 22:
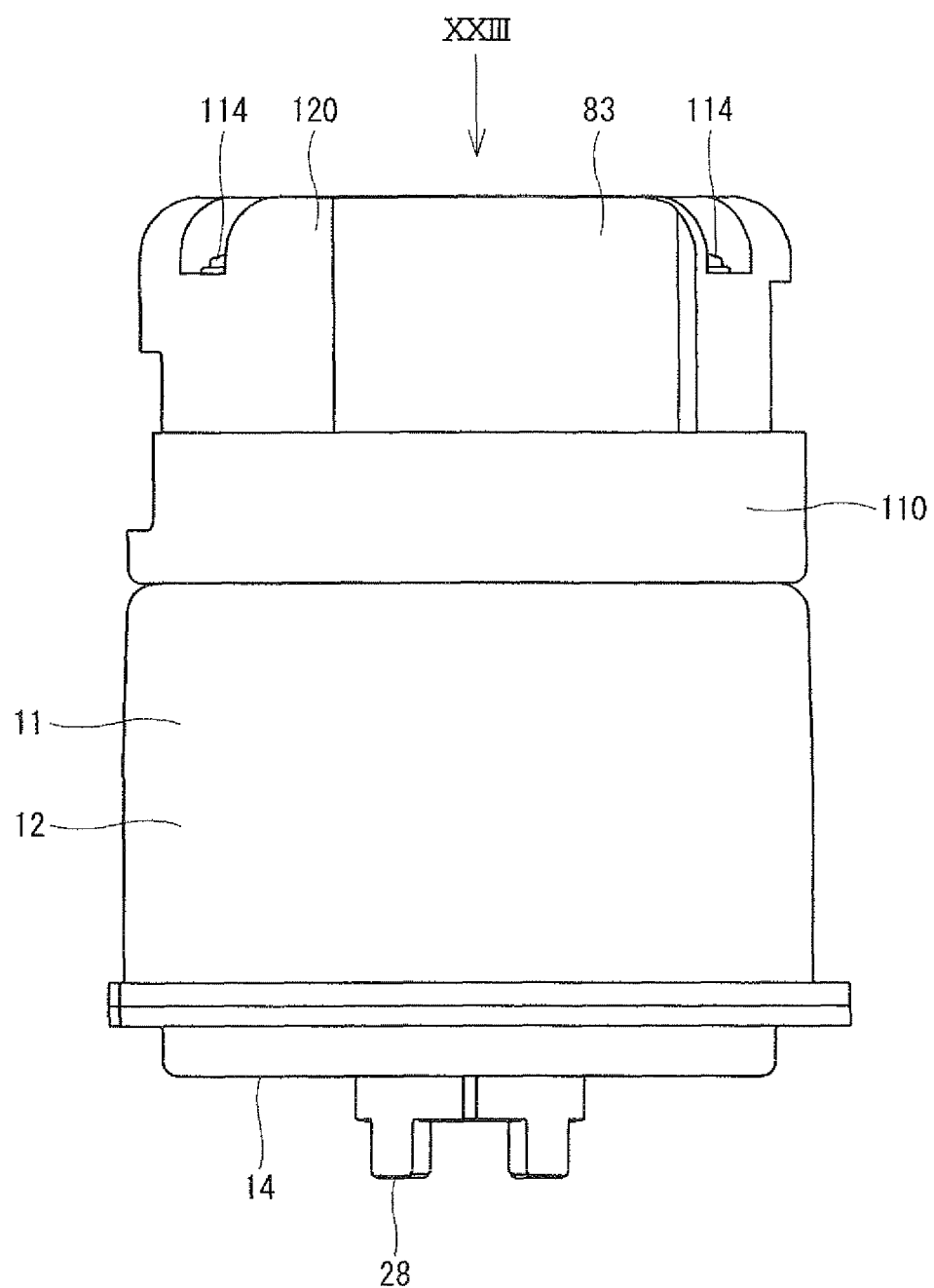
FIG. 22 is a schematic side view showing the electric motor device of the second embodiment.
Figure 23:
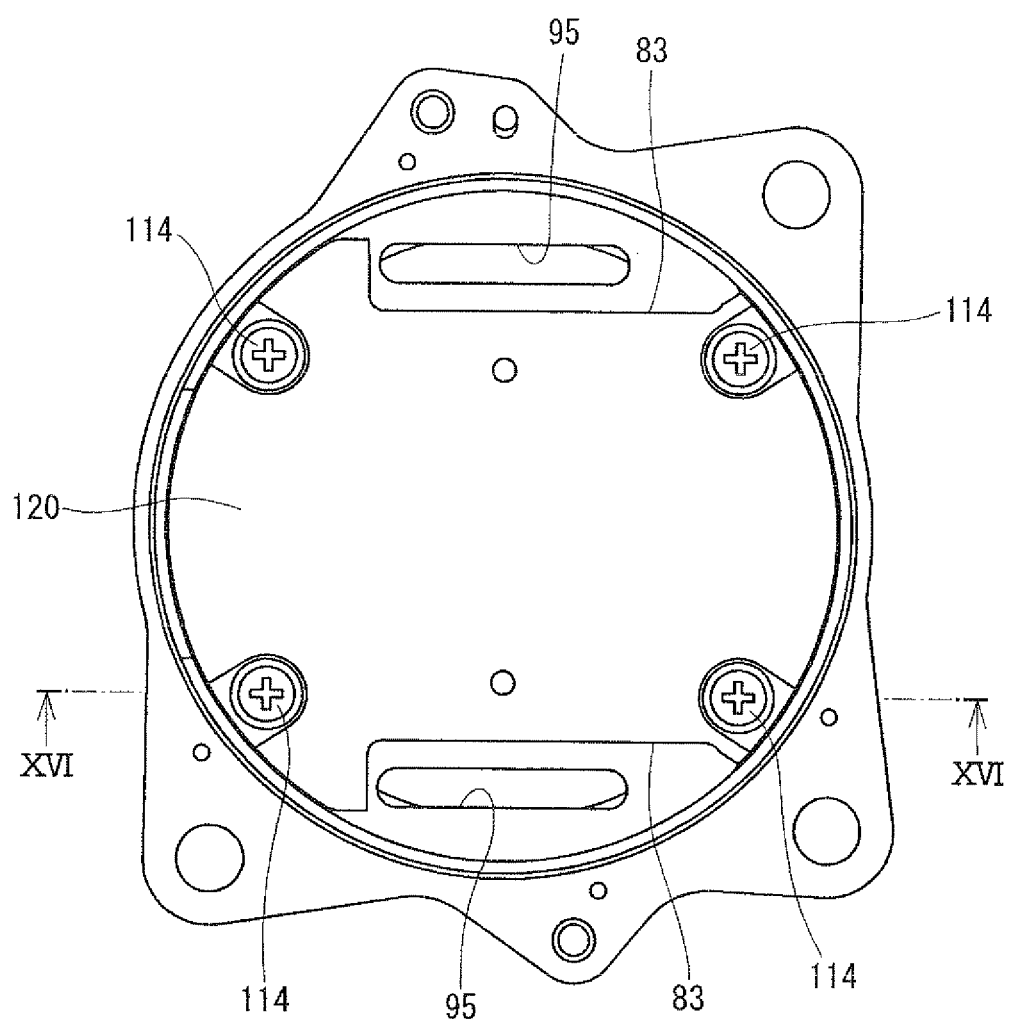
FIG. 23 is a schematic plan view showing the electric motor device when viewed in a direction XXIII in FIG. 22.

An electric motor device according to a second embodiment of the invention is shown in FIGS. 16 to 23. The same reference numerals to the first embodiment are used in the second embodiment for designating the same or similar parts and/or portions, so that the explanation thereof is omitted. In FIG. 16, the stator, the rotor and so on for the electric motor as well as the power module and the control board for the controller are omitted for the purpose of simplification.

According to, the second embodiment, multiple (four) wall thickness portions 112 are formed at a bottom plate portion 111 of an intermediate member 110 such that each of the wall thickness portions 122 is projected toward a heat sink 120 (in an upward direction in FIG. 16). A screw hole 113 is formed in each wall thickness portion 112 in an axial direction of the electric motor device.

Multiple (four) leg portions 121 are formed in the heat sink 120 such that each lower end of the leg portions 121 is in contact with an upper end of the respective wall thickness portions 112 of the intermediate member 110. Multiple (four) through-holes 122 are formed in the heat sink 120 at such portions corresponding to the respective screw holes 113 of the intermediate member 110. Each of the through-holes 122 is formed in the respective leg portions 121 in the axial direction.

According to an assembling process of the second embodiment, the leg portions 121 of the heat sink 120 are brought into contact with the wall thickness portions 112 of the intermediate member 110. Then, bolts 114 are inserted into the respective through-holes 122 and screwed into the screw hole 113, so that the heat sink 120 is firmly fixed to the intermediate member 110.

According to the second embodiment, the bolts 114 for fixing the heat sink 120 to the intermediate member 110 are filled in the heat sink 120. Since it is not necessary to keep a space in the controller for a process of fixing the bolts to the intermediate member 110, it is possible to keep a larger space for accommodating the power module 40. It is, therefore, possible to increase the space for the wiring plates 70 to 75, to increase the heat radiating performance, and thereby to increase design flexibility for the power module 40. It is further possible to increase the output of the electric motor device.

According to the second embodiment, the leg portions 121 of the heat sink 120 are brought into contact with the wall thickness portions 112 of the intermediate member 110. It is, therefore, possible to keep a distance in the axial direction between the position sensor 35 (which is mounted on the control board 30 fixed to the heat sink 120) and the magnet 29 (which is attached to the upper end of the rotating shaft 25 supported by the motor casing 11) at a constant value. Accordingly, it is possible to increase detection accuracy of the position sensor 35.

Third Embodiment

Figure 24:
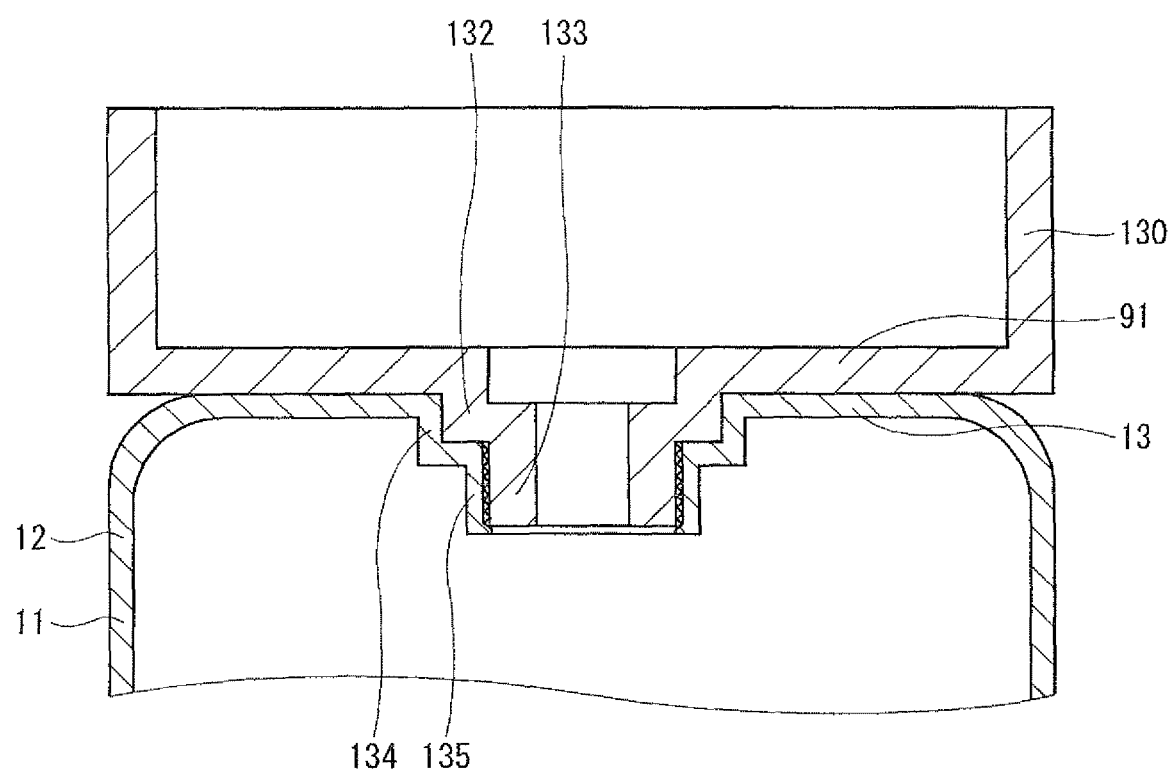
FIG. 24 is a schematic cross sectional view showing a relevant portion of an electric motor device according to a third embodiment of the present invention.

An electric motor device according to a third embodiment of the invention is shown in FIG. 24. According to the third embodiment, a third cylindrical portion 133 is formed in an inside of a second cylindrical portion 132 formed at the bottom plate portion 91 of an intermediate member 130, wherein an outer diameter of the third cylindrical portion 133 is smaller than that of the second cylindrical portion 132. A first cylindrical portion 134 corresponding to the second cylindrical portion 132 and a fourth cylindrical portion 135 corresponding to the third cylindrical portion 133 are likewise formed at the axial end plate 13 of the motor casing 11. An outer cylindrical surface of the third cylindrical portion 133 is screwed into an inner cylindrical surface of the fourth cylindrical portion 135.

According to the third embodiment, the second cylindrical portion 132 of the intermediate member 130 is fixed to the first cylindrical portion 134 of the motor casing 11 by press fit method, so that the intermediate member 130 is coaxially fixed to the motor casing 11. Since the third cylindrical portion 133 is screwed into the fourth cylindrical portion 135, the intermediate member 130 can be fixed to the motor casing 11 in a simple structure.

Fourth Embodiment

Figure 25:
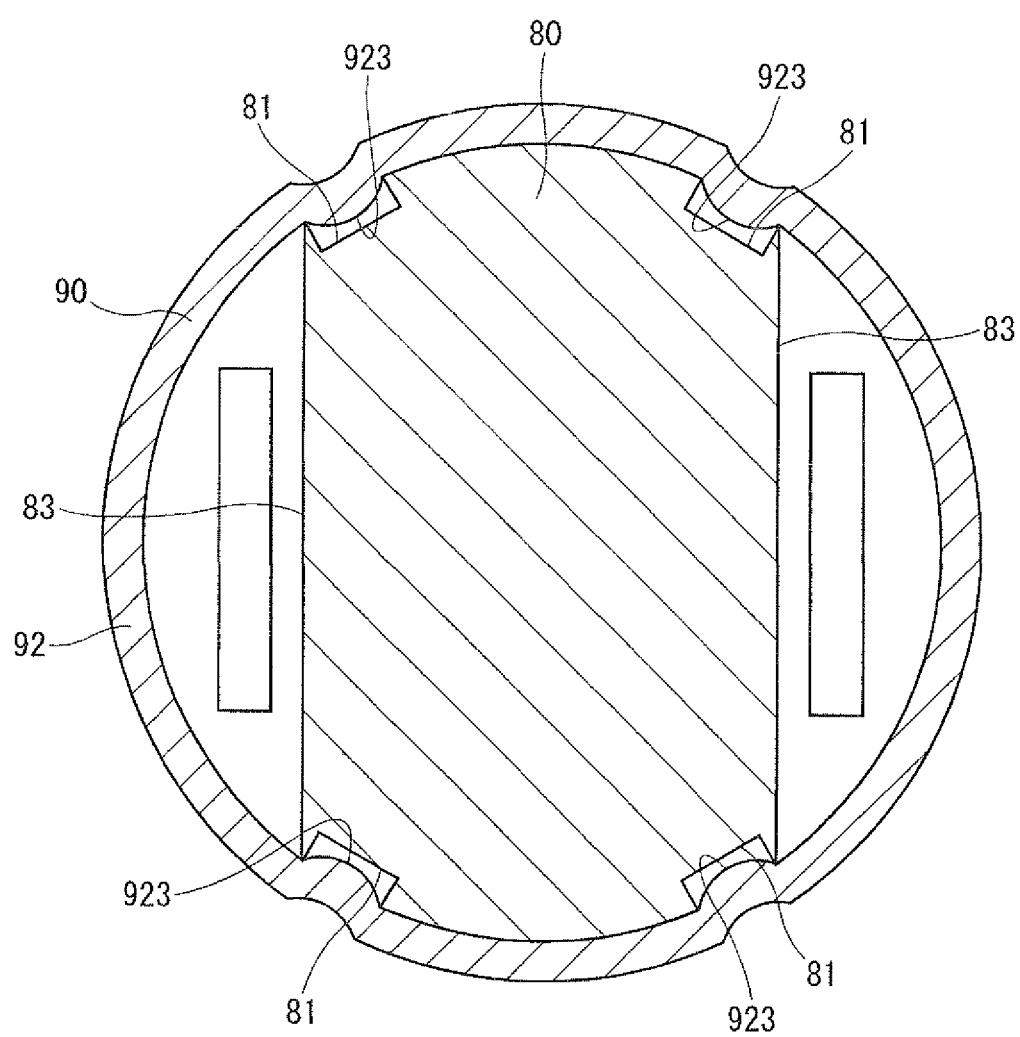
FIG. 25 is a schematic cross sectional view showing a relevant portion of an electric motor device according to a fourth embodiment.

An electric motor device according to a fourth embodiment of the invention is shown in FIG. 25.

According to the fourth embodiment, recessed portions 81 are formed at corners of the heat sink 80. Projected portions 923 are formed at the inner surface of the cylindrical side wall 92 of the intermediate member 90, so that each of the projected portions 923 partly projects into the respective recessed portions 81.

According to a manufacturing and assembling process of the fourth embodiment, the heat sink 80 is assembled to the intermediate member 90. At this moment, the projected portions 923 are not yet formed. After the heat sink 80 is assembled to the intermediate member 90, portions of the side wall 92 corresponding to the respective recessed portions 81 are pressed in a radial inward direction to form the projected portions 923. As a result, each of the projected portions 923 is engaged with the respective recessed portions 81, so that the heat sink 80 is firmly fixed to the intermediate member 90.

As above, the heat sink 80 can be fixed to the intermediate member in a simple structure.

Fifth Embodiment

Figure 26:
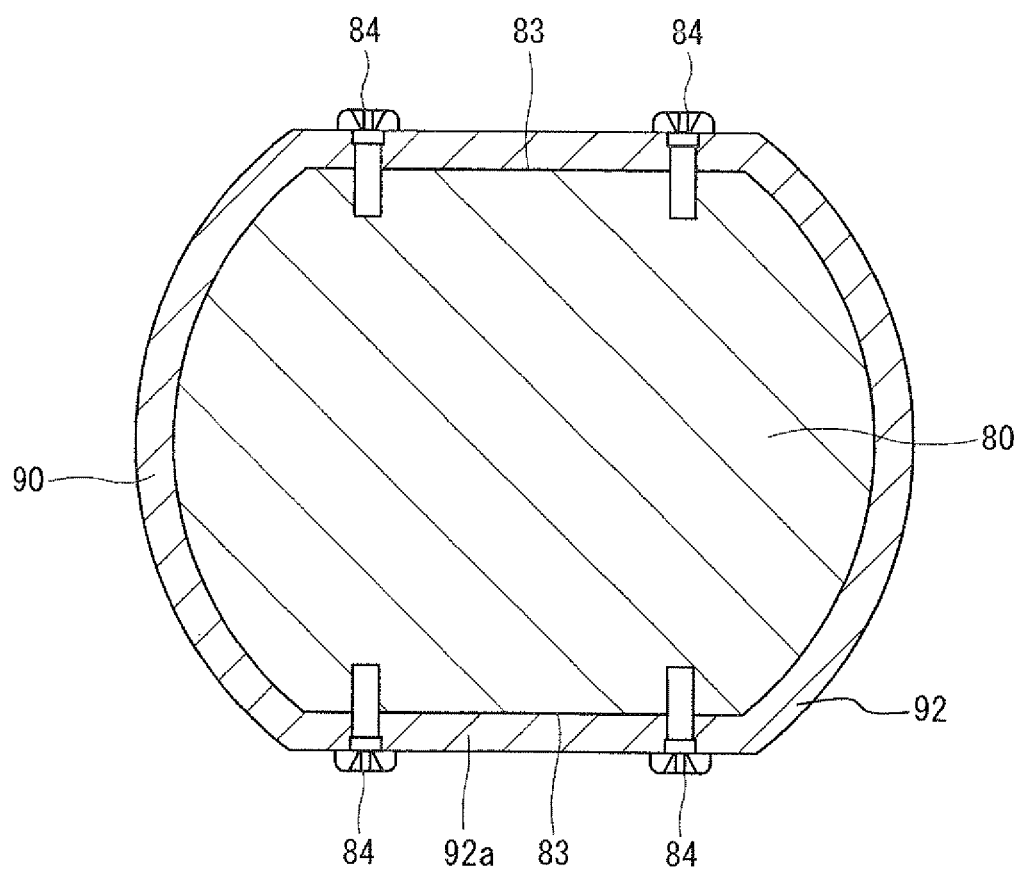
FIG. 26 is a schematic cross sectional view showing a relevant portion of an electric motor device according to a fifth embodiment.

An electric motor device according to a fifth embodiment of the invention is shown in FIG. 26.

According to the fifth embodiment, the heat sink 80 has a pair of flat surface portions 83 at both sides in the radial direction. The side wall 92 of the intermediate member 90 is formed in such a shape having a pair of flat wall portions 92a, so that each of the flat surface portions 83 is in contact with the respective flat wall portions 92a.

According to an assembling process of the fifth embodiment, the heat sink 80 is assembled to the intermediate member 90 so that each flat surface portion 83 is brought into contact with the corresponding flat wall portion 92a of the intermediate member 90. Then, screws (or bolts) 84 are screwed from an outside of the intermediate member 90 into respective screw holes formed in the heat sink 80.

According to the present embodiment, screw heads of the screws (or bolts) 84 as well as the heat sink 80 are arranged in the space, which is not larger than the size of the motor casing 11 in the radial direction.

Sixth Embodiment

Figure 27:
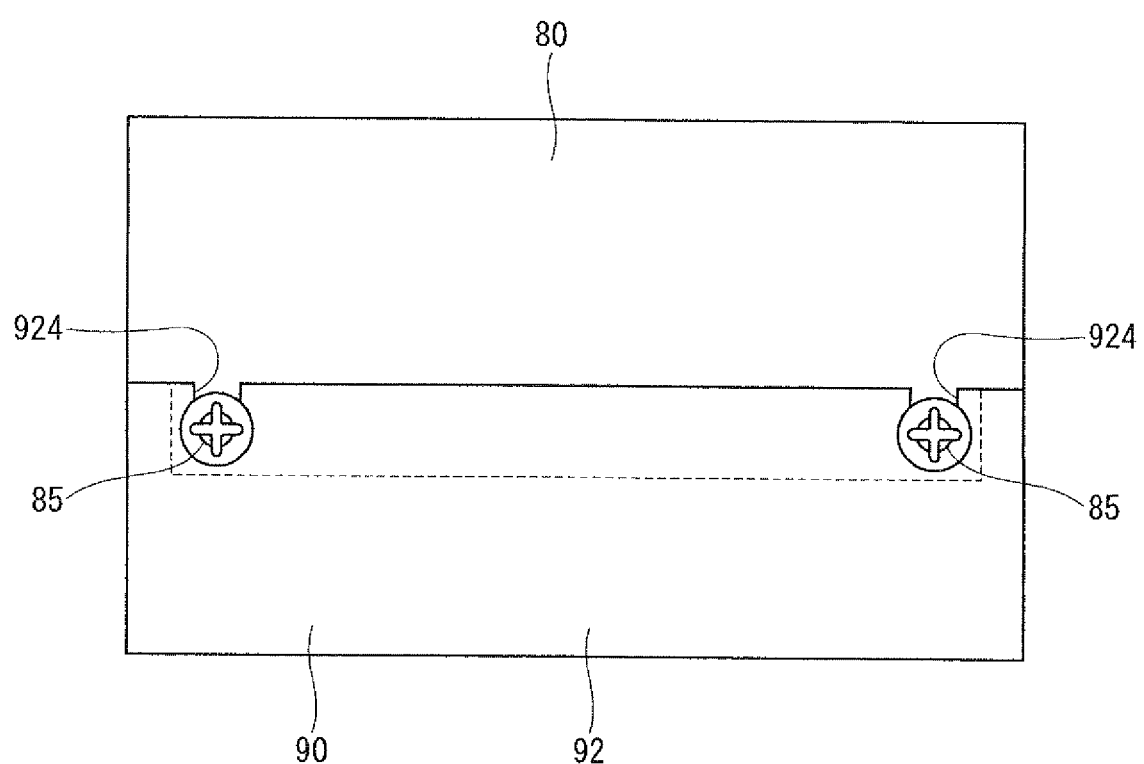
FIG. 27 is an enlarged view showing a relevant portion of an electric motor device according to a sixth embodiment.

An electric motor device according to a sixth embodiment of the invention is shown in FIG. 27.

According to the sixth embodiment, multiple slit portions 924 are formed in the side wall 92 of the intermediate member 90. Multiple screws (or bolts) 85 are screwed from an outside of the intermediate member 90 into the heat sink 80 at the respective slit portions 924, so that the heat sink 80 is firmly fixed to the intermediate member 90.

Seventh Embodiment

Figure 28:
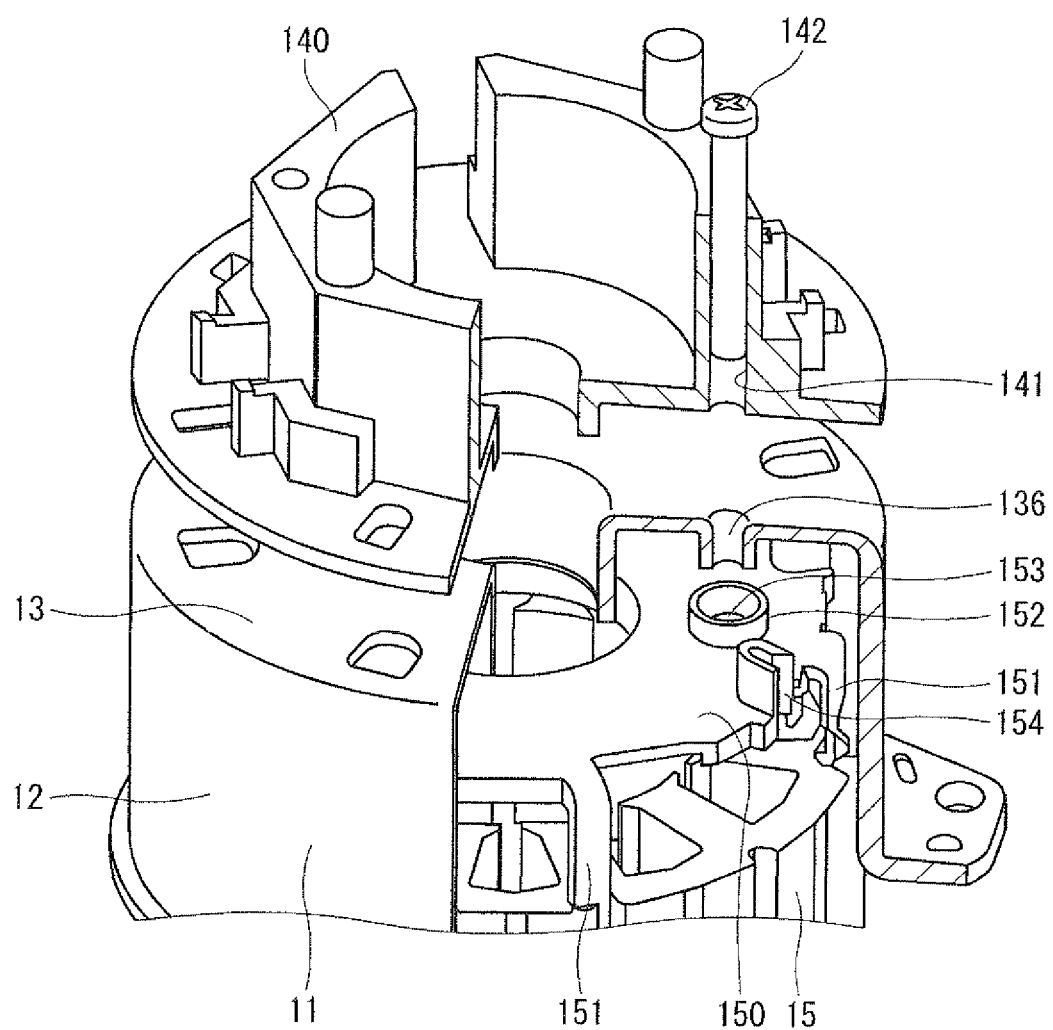
FIG. 28 is an exploded perspective view showing a relevant portion of an electric motor device according to a seventh embodiment.

An electric motor device according to a seventh embodiment of the invention is shown in FIG. 28. In FIG. 28, the stator, the rotor and so on for the electric motor as well as the power module and the control board for the controller are omitted for the purpose of simplification.

According to the seventh embodiment, a heat sink 140 is directly fixed to the axial end plate 13 of the motor casing 11. A screwed portion 136 is formed in the axial end plate 13 of the motor casing 11. The screwed portion 136 extends from the axial end plate 13 to the inside of the motor casing 11. A through-hole 141 is axially formed in the heat sink 140 at such a position corresponding to the screwed portion 136.

A bolt 142 is inserted into the through-hole 141 from an upper side of the heat sink 140 opposite to the motor casing 11. The bolt 142 is screwed into the screwed portion 136, so that the heat sink 140 is firmly fixed to the motor casing 11.

A holder plate 150 is provided in the motor casing 11 between the axial end plate 13 and the stator 15. The holder plate 150 is made of, for example, resin and fixed to an outer peripheral portion of the stator 15 by detent portions 151.

A tray portion 152 of a cylindrical shape having a bottom is formed in the holder plate 150 in order to receive and hold extraneous material, which may be produced for example in an assembling process. The tray portion 152 is located beneath the screwed portion 136, and an inner diameter of the tray portion 152 is larger than an outer diameter of the screwed portion 136 for covering an outer wall of the screwed portion 136. When the stator 15 is fixed to the motor casing 11, a lower end of the screwed portion 136 is inserted into the tray portion 152 to form a labyrinth structure between them. A stickum 153 is applied to the tray portion 152.

A guide portion 154 is formed in the holder plate 150 so as to guide the connecting lead wires 19, which are taken out from the stator coils 18 toward a side of the heat sink 140.

According to the present embodiment, the extraneous material, which is produced when the heat sink 140 is fixed to the motor casing 11 by the bolt 142, is trapped by the tray portion 152. The extraneous material trapped in the tray portion 152 is stuck to the stickum 153. In addition, come-out of the extraneous material is suppressed by the labyrinth structure.

As a result, it is possible to suppress the situation that the extraneous material may come into spaces between the stator 15 and the rotor 21 and thereby the operation of the stator 15 as well as the rotor 21 may be adversely affected.

In addition, since the connecting lead wires 19 is positioned by the guide portion 154 of the holder plate 150, a connecting process between the connecting lead wires 19 and the terminals 78 of the power module 40 can be easily done.

Eighth Embodiment

Figure 29:
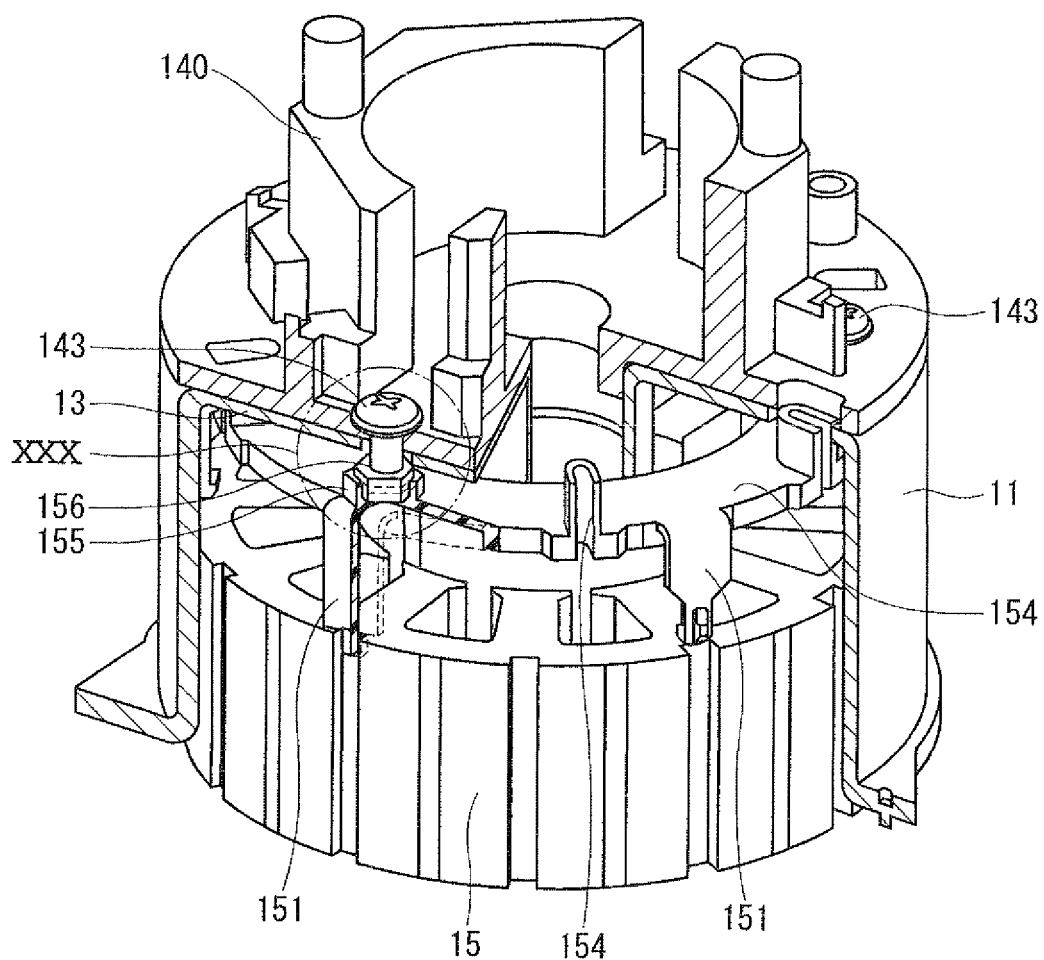
FIG. 29 is a perspective view showing a relevant portion of an electric motor device according to an eighth embodiment.
Figure 30:
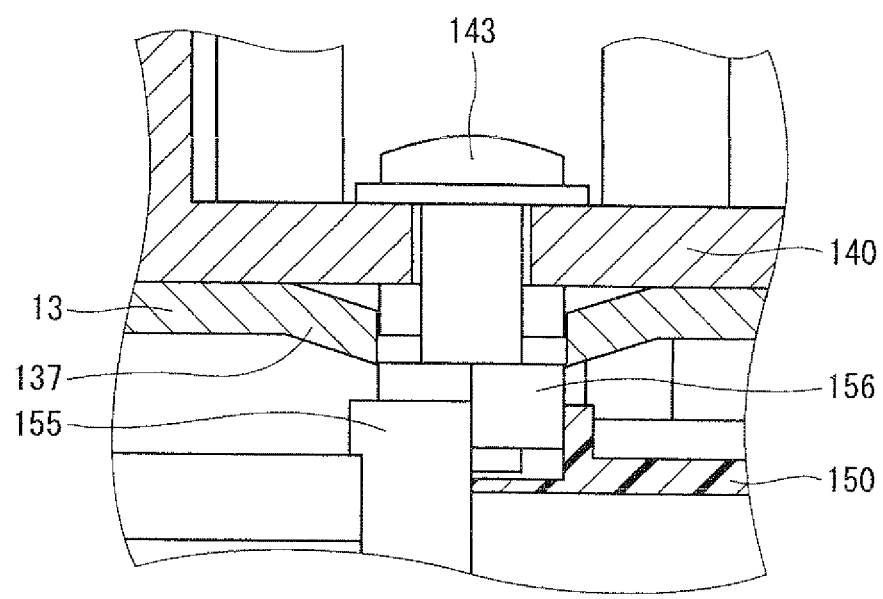
FIG. 30 is an enlarged cross sectional view showing a portion circled by a two-dot-chain line XXX in FIG. 29.

An electric motor device according to an eighth embodiment of the invention is shown in FIGS. 29 and 30. According to the eighth embodiment, a screwed portion is not provided in the motor casing 11. Instead, a cylindrical supporting portion 155 is formed in the holder plate 150 and a nut 156 is supported in the supporting portion 155.

A bolt 143 is inserted into a through-hole of the heat sink 140 from an upper side thereof opposite to the motor casing 11. The bolt 143 is screwed into the nut 156, so that the heat sink 140 is firmly fixed to the motor casing 11. The nut 156 is engaged with a claw portion 137 formed in the axial end plate 13 of the motor casing 11, so that the nut 156 is also prevented from being rotated.

According to the present embodiment, since the screwed portion (136) is not provided in the motor casing 11, a manufacturing cost can be reduced. When any extraneous material is produced during a process of screwing the bolt 143 into the nut 156, such material is trapped by the supporting portion 155. As a result, it is possible to suppress the situation that the extraneous material may come into spaces between the stator 15 and the rotor 21 and thereby the operation of the stator 15 as well as the rotor 21 may be adversely affected.

Ninth Embodiment

Figure 31:
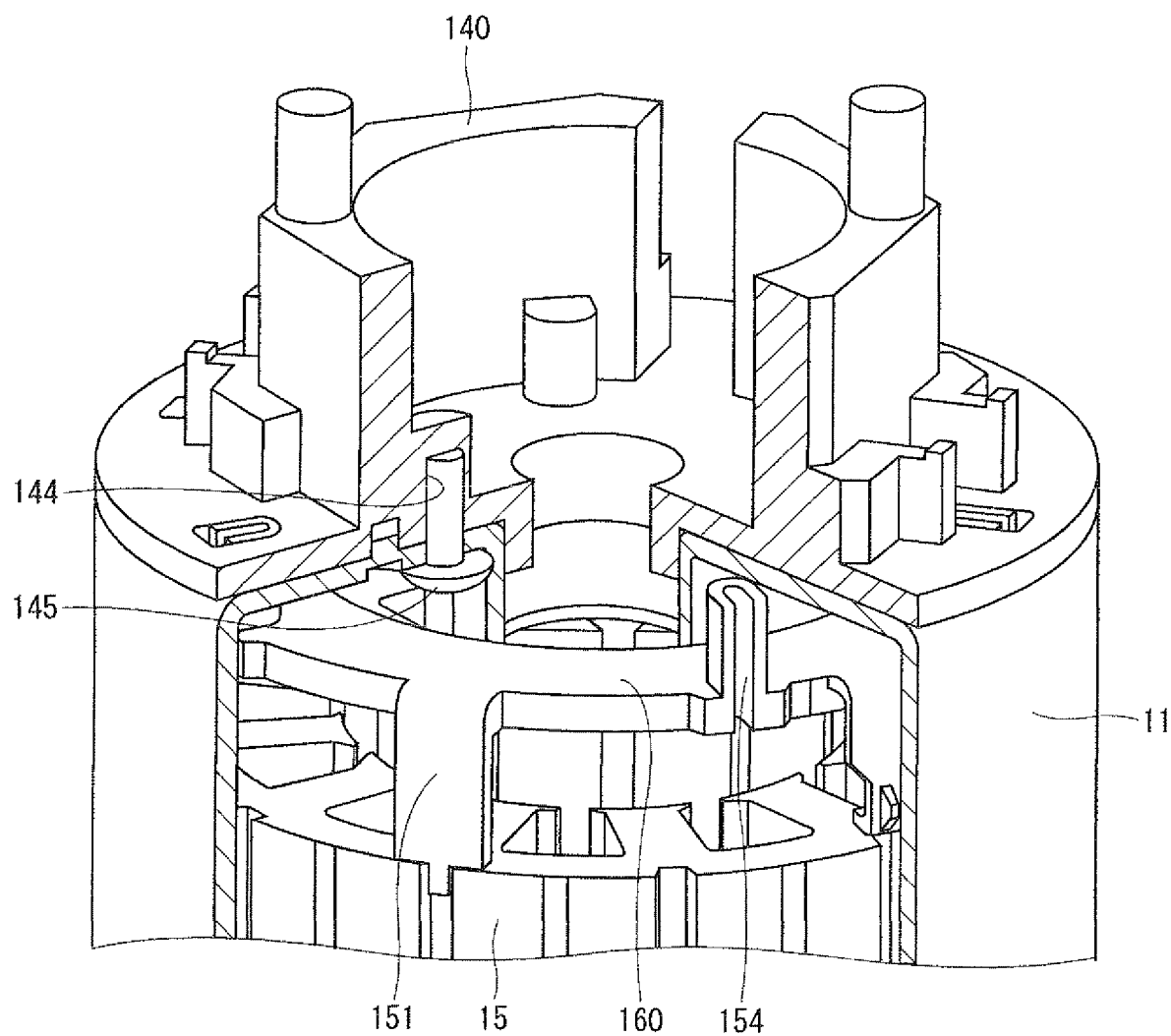
FIG. 31 is a perspective view showing a relevant portion of an electric motor device according to a ninth embodiment.
Figure 32:
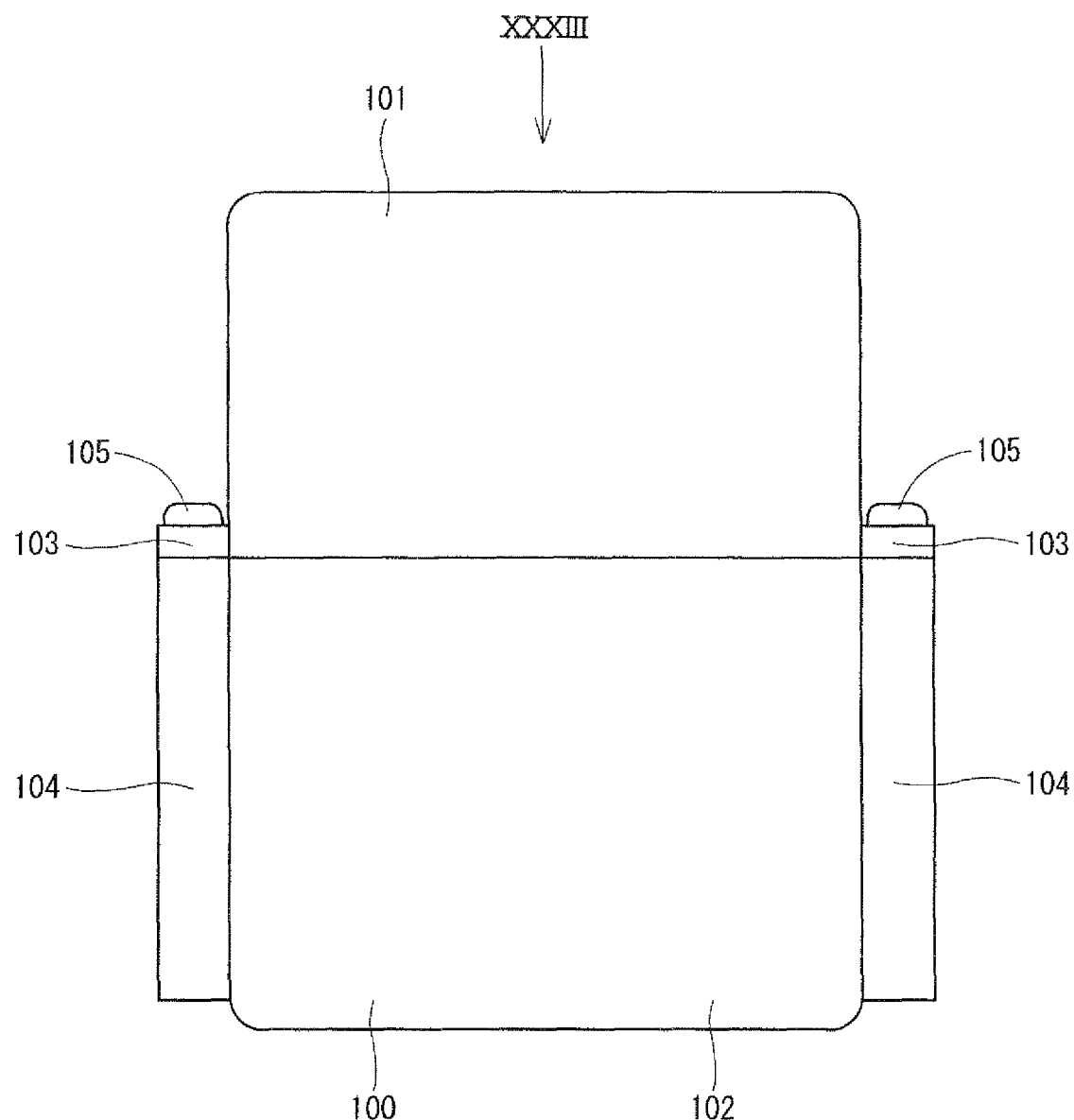
FIG. 32 is a schematic side view showing an electric motor device according to a prior art.
Figure 33:
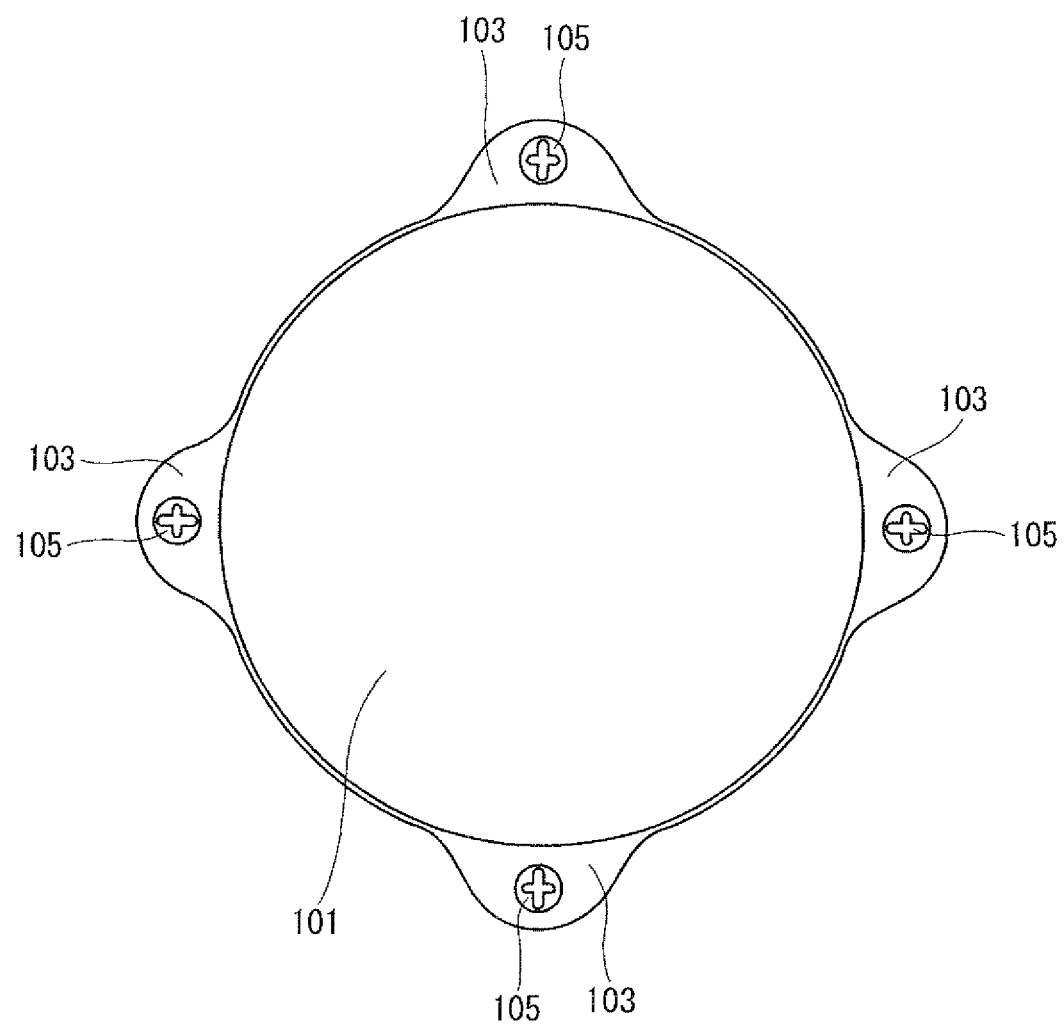
FIG. 33 is a schematic plan view showing the electric motor device of the prior art when viewed in a direction XXXIII in FIG. 32.

An electric motor device according to a ninth embodiment of the invention is shown in FIG. 31. According to the ninth embodiment, a screwed portion 144 is formed in the heat sink 140 on a side thereof to the motor casing 11. When a bolt 145 is inserted and screwed from the inside of the motor casing 11 into the screwed portion 144, the heat sink 140 is firmly fixed to the motor casing 11.

A holder plate 160 is provided in the motor casing 11 so that it prevents the bolt 145 from falling into the motor casing 11.

According to the present embodiment, it is not necessary to provide a space in the heat sink 140 for a process of screwing the bolt 145. It is, therefore, possible to keep a larger space for accommodating the power module 40. As a result, it is possible to increase design flexibility for the power module 40 and to increase the output of the electric motor device.

Other Embodiments

In the above embodiments, the invention is applied to the brushless motor for the electrical power steering device. The invention may be applied to various kinds of the motor device other than the power steering device. The invention may be also applied to a brush-type electric motor, in which a rotor coil is wound on the rotor.

In the above embodiments, two sets of inverter circuits are formed by twelve power transistors and the electric motor is operated by two control systems. The electric motor may be operated by one or three control systems (or more than three control systems).

In the above embodiments, the multiple power transistors and the wiring plates are arranged on the same plane and the power module is formed by molded resin, and the power module is horizontally arranged in parallel to the heat sink. The power transistors and the wiring plates may be separately resin-molded and such resin-molded power transistors may be vertically arranged at a side of the heat sink.

As above, the present inventions should not be limited to the above embodiments, but the invention may be modified in various manners without departing from the spirit of the invention, in addition to the combination of the multiple embodiments.

What is claimed is:

1. An electric motor device comprising:
   a motor casing having a cylindrical wall portion and an axial end plate extending from one axial end of the cylindrical wall portion in a radial and inward direction;
   a stator fixed to an inner peripheral surface of the motor casing;
   a rotor rotatably supported in the motor casing so that the rotor is rotated in the stator;
   a power module provided at an outside of the motor casing at one axial end of a rotating shaft of the rotor for supplying driving current to coils wound on the stator and/or the rotor;
   a heat sink provided at the outside of the motor casing, the power module being fixed to the heat sink so that heat generated at the power module is absorbed by the heat sink; and
   an intermediate member provided between the motor casing and the heat sink,
   wherein the intermediate member has a bottom plate portion fixed to the axial end plate of the motor casing and a side wall axially extending from the bottom plate portion in a direction opposite to the motor casing,
   an upper end of the side wall is in contact with the heat sink, and
   the intermediate member is arranged in a space which is not larger than a size of the motor casing in its radial direction, wherein
   the heat sink has multiple projections at the outer peripheral surface thereof, each of which is projected in a radial outward direction and brought into contact with an upper end of the side wall of the intermediate member,
   the intermediate member has multiple claw portion at such positions corresponding to the respective projections, each of which is axially extending from the upper end of the side wall of the intermediate member, and
   each of the claw portions is bent in a circumferential direction, so that the heat sink is firmly fixed to the intermediate member.

* * * * *